US011938503B2

(12) United States Patent
Takahashi et al.

(10) Patent No.: US 11,938,503 B2
(45) Date of Patent: Mar. 26, 2024

(54) ULTRAFINE BUBBLE-CONTAINING LIQUID MANUFACTURING APPARATUS AND MANUFACTURING METHOD

(71) Applicant: CANON KABUSHIKI KAISHA, Tokyo (JP)

(72) Inventors: Kenji Takahashi, Yokohama (JP); Masahiko Kubota, Tokyo (JP); Ikuo Nakazawa, Kawasaki (JP); Akitoshi Yamada, Yokohama (JP); Nobuhisa Tanahashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 289 days.

(21) Appl. No.: 16/642,426

(22) PCT Filed: Aug. 22, 2018

(86) PCT No.: PCT/JP2018/031029
§ 371 (c)(1),
(2) Date: Feb. 27, 2020

(87) PCT Pub. No.: WO2019/044631
PCT Pub. Date: Mar. 7, 2019

(65) Prior Publication Data
US 2020/0197963 A1 Jun. 25, 2020

(30) Foreign Application Priority Data
Aug. 31, 2017 (JP) ................................ 2017-167598

(51) Int. Cl.
*B05B 7/16* (2006.01)
*B05B 7/08* (2006.01)
(Continued)

(52) U.S. Cl.
CPC .......... *B05B 7/1686* (2013.01); *B05B 7/0876* (2013.01); *B05B 15/40* (2018.02); *B05B 15/531* (2018.02); *B05B 15/68* (2018.02)

(58) Field of Classification Search
CPC ..... B05B 7/1686; B05B 15/40; B05B 15/531; B05B 15/68; B05B 7/0876; B41J 2/1404; B41J 2/1412
(Continued)

(56) References Cited

U.S. PATENT DOCUMENTS 5,742,118 A * 4/1998 Endo ..................... H01J 29/896 106/287.34
6,290,685 B1 * 9/2001 Insley ..................... A61M 1/84 366/DIG. 3
(Continued)

FOREIGN PATENT DOCUMENTS

CN 105882147 A 8/2016
EP 0 775 580 A2 5/1997
(Continued)

OTHER PUBLICATIONS

Machine Translation of JP-2016112477-A Description, Sep. 2022, Espacenet, 3 Pages (Year: 2022).*
(Continued)

*Primary Examiner* — Joseph A Greenlund
*Assistant Examiner* — Kevin Edward Schwartz
(74) *Attorney, Agent, or Firm* — Venable LLP

(57) ABSTRACT

An ultrafine bubble (UFB)-containing liquid manufacturing apparatus includes a liquid ejecting unit having a thermal energy generating element, a flow path for leading liquid to the thermal energy generating element, a driving unit configured to drive the thermal energy generating element, and an ejection opening. The UFB-containing liquid manufacturing apparatus also includes a collecting unit configured to
(Continued)

collect liquid ejected from the ejection opening. The driving unit drives the thermal energy generating element to cause film boiling in liquid led to the flow path and causes liquid containing ultrafine bubbles generated by the film boiling to be ejected from the ejection opening.

22 Claims, 27 Drawing Sheets

(51) Int. Cl.
*B05B 15/40* (2018.01)
*B05B 15/531* (2018.01)
*B05B 15/68* (2018.01)

(58) Field of Classification Search
USPC .............................................................. 239/8
See application file for complete search history.

(56) References Cited

U.S. PATENT DOCUMENTS 6,409,317 B1* 6/2002 Shimazu .............. B41J 2/14048 347/65
6,443,561 B1 9/2002 Murakami
6,471,350 B2 10/2002 Katsuragi et al.
8,356,885 B2 1/2013 Silverbrook et al.
8,740,450 B2 6/2014 Mogami et al.
9,764,254 B2* 9/2017 Kobayashi ........ B01F 23/21322
9,796,184 B2* 10/2017 Hara .................... B41J 2/16538
9,804,607 B1* 10/2017 Coleman ............... F28F 21/065
10,022,681 B2* 7/2018 Spears ................ B01F 23/2319
11,103,838 B2* 8/2021 Kato ......................... B08B 5/02
2002/0101476 A1 8/2002 Katsuragi et al.
2006/0209138 A1 9/2006 Kachi
2006/0221107 A1* 10/2006 Silverbrook ........... B41J 2/1628 347/14
2008/0174619 A1* 7/2008 Katsumura ........... B01F 23/451 347/9
2010/0103216 A1 4/2010 Silverbrook et al.
2012/0016508 A1* 1/2012 Matsuzaki ........ H01J 37/32623 700/108
2013/0063525 A1* 3/2013 Sieber ................... C23C 16/405 347/45
2013/0321540 A1* 12/2013 Platt ..................... B41J 2/17593 347/89
2014/0273155 A1 9/2014 Miyao et al.
2015/0029267 A1 1/2015 Kato et al.
2015/0068712 A1* 3/2015 Kim ...................... F28F 13/187 165/133
2015/0307729 A1* 10/2015 Gotou .................... C09D 11/38 106/31.77
2016/0137861 A1* 5/2016 Tyvoll ........................ B41J 2/01 347/56
2016/0220969 A1* 8/2016 Spears .................... B01F 25/53
2016/0228834 A1* 8/2016 Roe ....................... B01F 23/232
2017/0340991 A1* 11/2017 Kobayashi .............. C02F 1/444
2019/0134574 A1* 5/2019 Tsuchiya ................. B01F 25/46
2019/0329520 A1* 10/2019 Tachibana ............. B32B 27/065
2020/0179882 A1* 6/2020 Kato .......................... B08B 5/02

FOREIGN PATENT DOCUMENTS

EP 1 078 757 A2 2/2001
EP 1 078 758 A2 2/2001
JP 5-16365 A 1/1993
JP 2001-130005 5/2001
JP 2001-130005 A 5/2001
JP 2002-137399 5/2002
JP 2002-137399 A 5/2002
JP 2008-183502 A 8/2008
JP 4456176 B2 4/2010
JP 2014-171463 A 9/2014
JP 2016112477 A * 6/2016 ................ B01F 3/04
JP 2016-165431 A 9/2016
JP 6118544 B2 4/2017
WO 2013/036424 A1 3/2013
WO 2013/062054 A1 5/2013
WO 2015/048904 A1 4/2015
WO 2016/175740 A1 11/2016
WO 2019/044913 A1 3/2019

OTHER PUBLICATIONS

Kubota et al., U.S. Appl. No. 16/642,432, filed Feb. 27, 2020.
Kubota et al., U.S. Appl. No. 16/802,685, filed Feb. 27, 2020.
Ozaki et al., U.S. Appl. No. 16/802,672, filed Feb. 27, 2020.
Arimizu et al., U.S. Appl. No. 16/802,675, filed Feb. 27, 2020.
Imanaka et al., U.S. Appl. No. 16/802,688, filed Feb. 27, 2020.
Imanaka et al., U.S. Appl. No. 16/802,693, filed Feb. 27, 2020.
Ishinaga et al., U.S. Appl. No. 16/802,680, filed Feb. 27, 2020.
Yanai et al., U.S. Appl. No. 16/802,677, filed Feb. 27, 2020.
Ozaki et al., U.S. Appl. No. 16/802,667, filed Feb. 27, 2020.
Imanaka et al., U.S. Appl. No. 16/802,661, filed Feb. 27, 2020.
Imanaka et al., U.S. Appl. No. 16/802,652, filed Feb. 27, 2020.
Notice of Reasons for Refusal in Japanese Application No. 2017-167598 (dated Jan. 2022).
First Office Action in Chinese Application No. 201880055619.9 (dated Mar. 2021).
S. Calgaroto et al., "On the Nanobubbles Interfacial Properties and Future Applications in Flotation," 60 Miner. Eng. 33-40 (Feb. 2014) (XP028841925).
Notice of Reasons for Refusal in Japanese Application No. 2017-167598 (dated Jul. 2021).

* cited by examiner

[Fig. 1A]
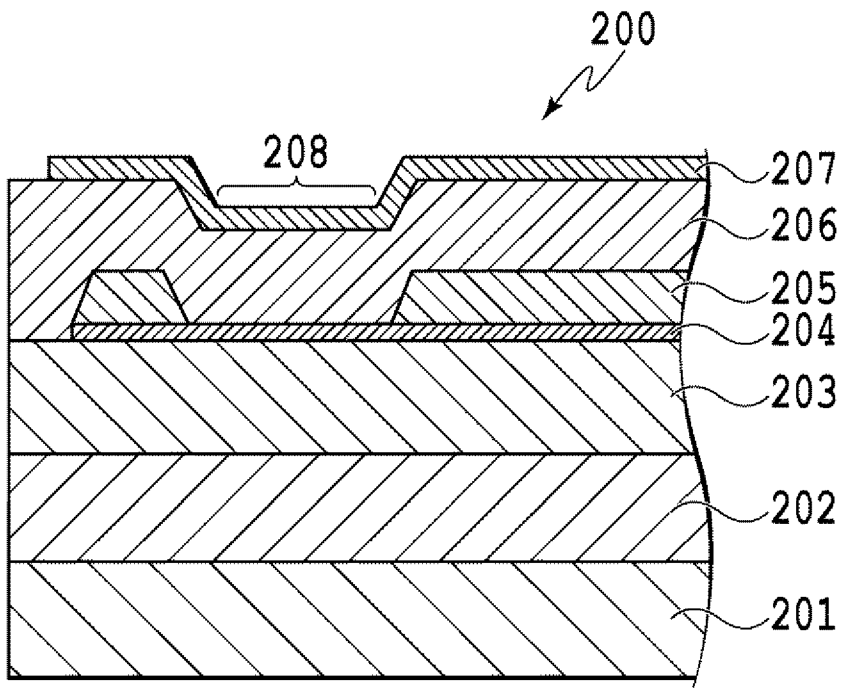
[Fig. 1B]
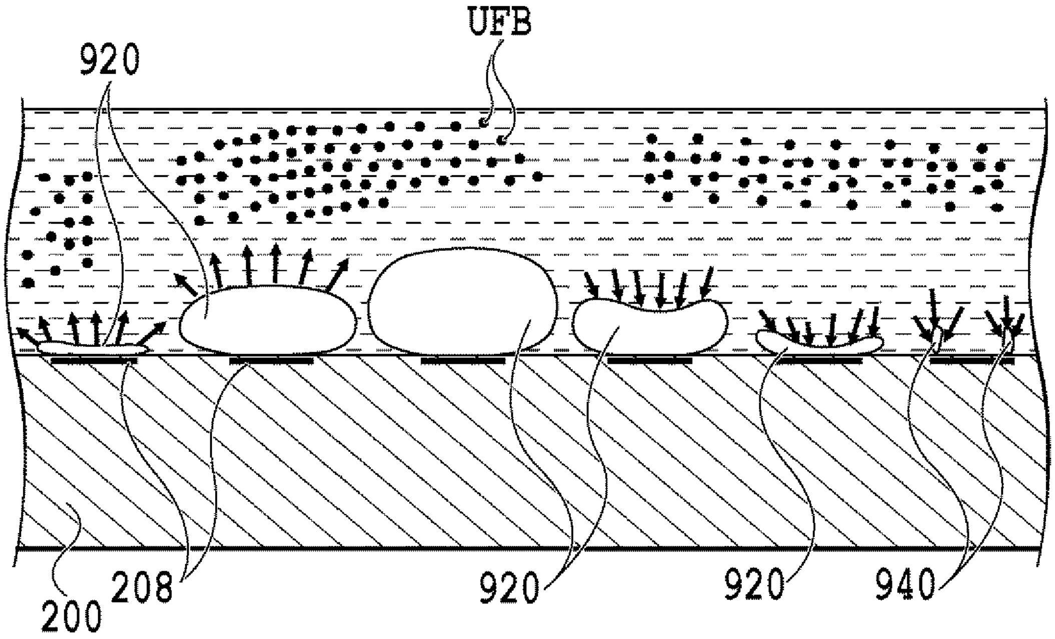

[Fig. 2A]
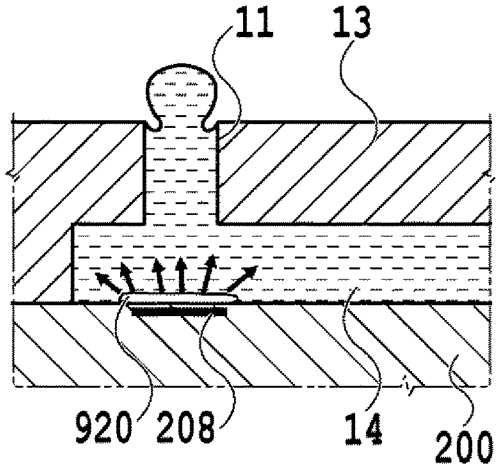
[Fig. 2B]
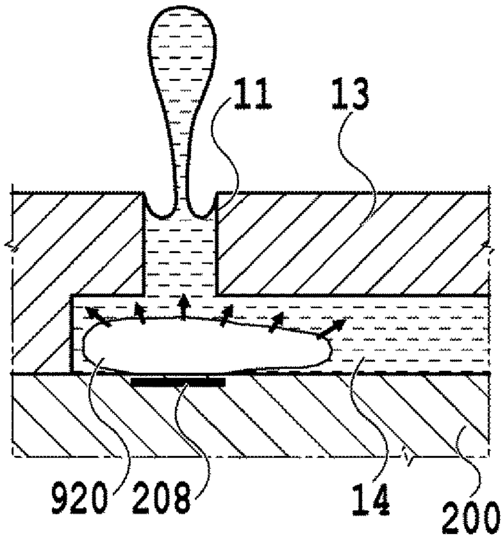
[Fig. 2C]
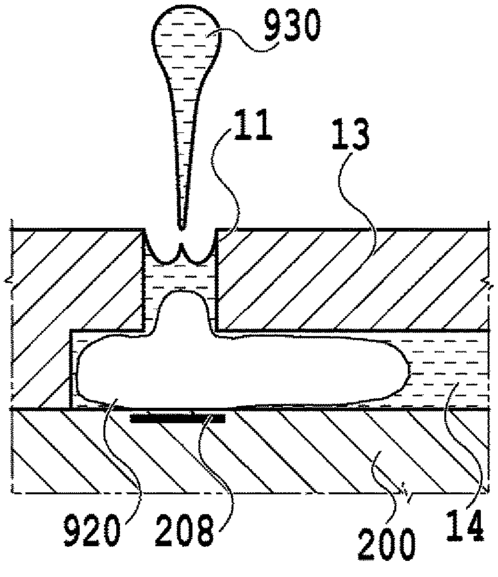

[Fig. 2D]
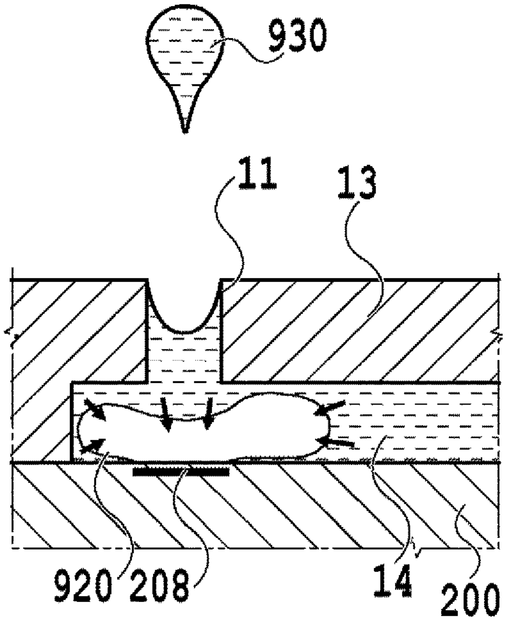
[Fig. 2E]
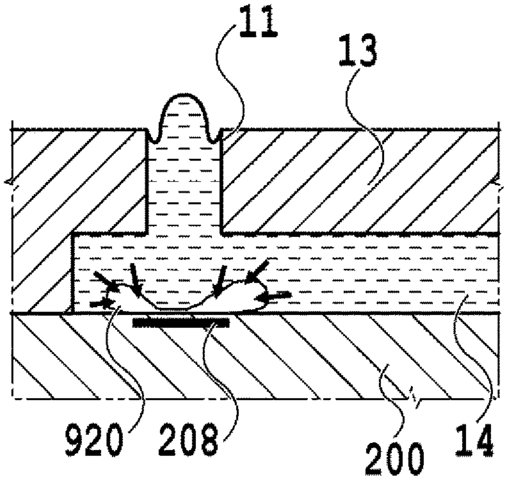
[Fig. 2F]
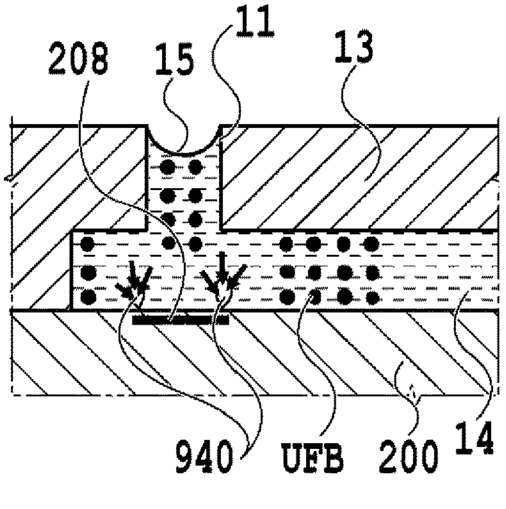

[Fig. 3A]
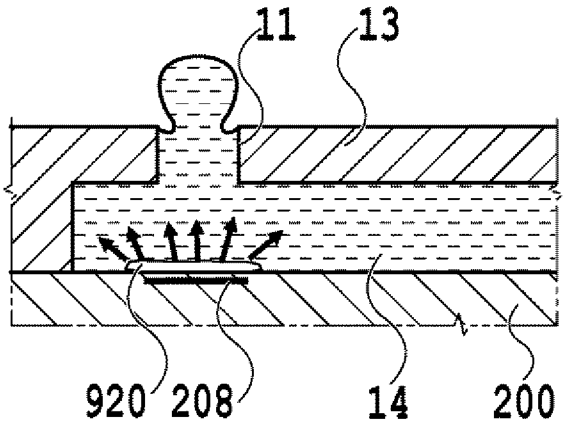
[Fig. 3B]
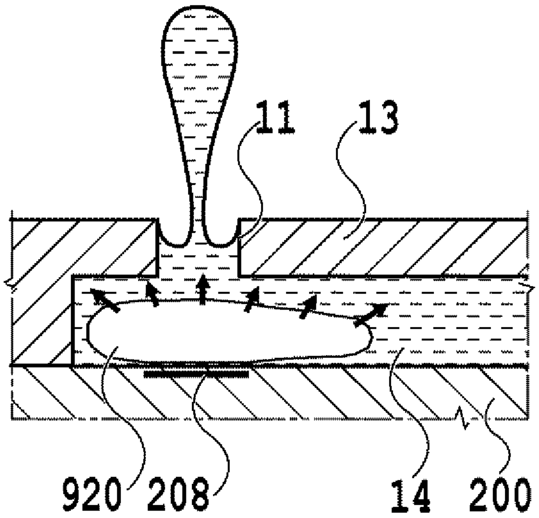
[Fig. 3C]
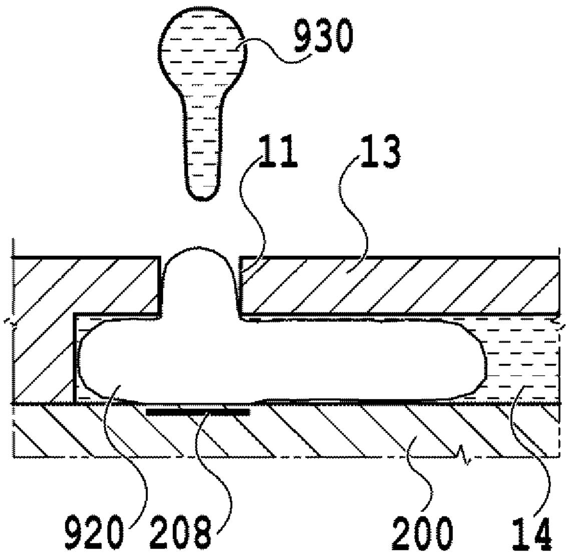

[Fig. 3D]
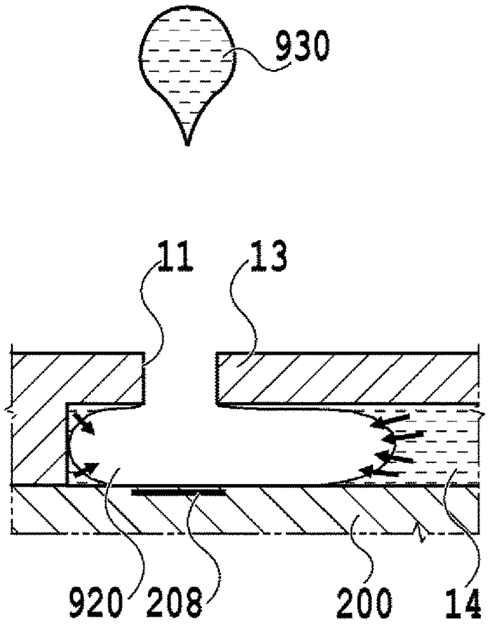
[Fig. 3E]
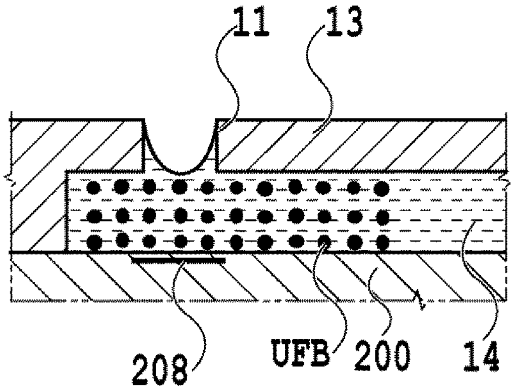
[Fig. 4A]
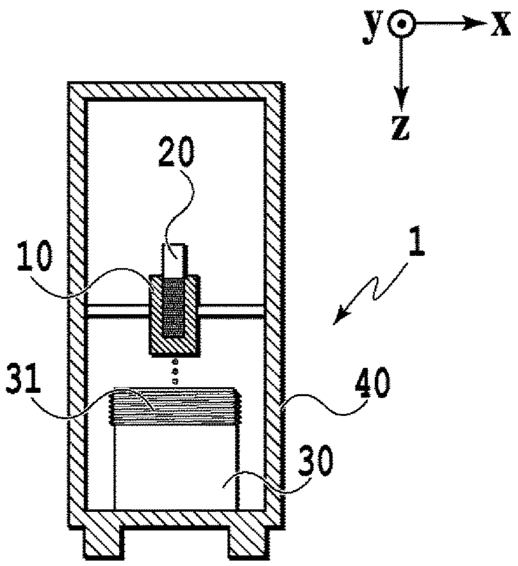

[Fig. 4B]
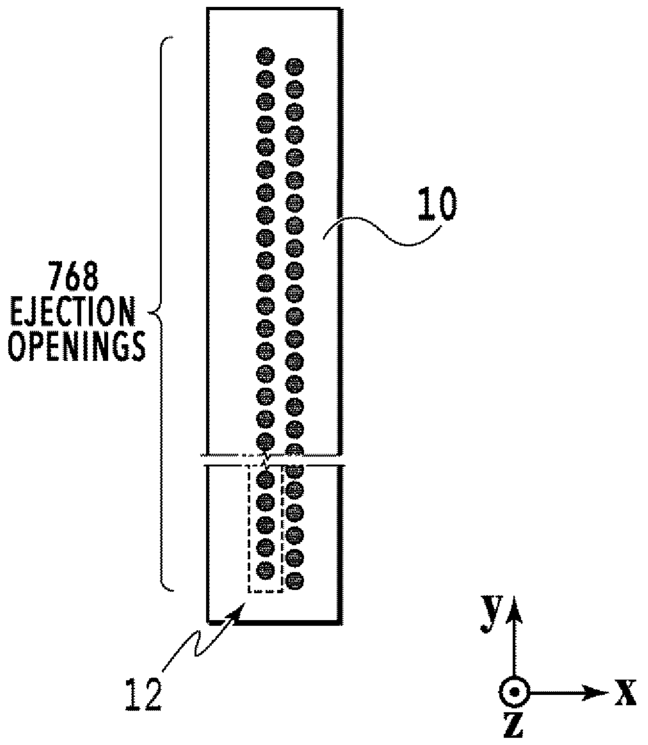
[Fig. 5]
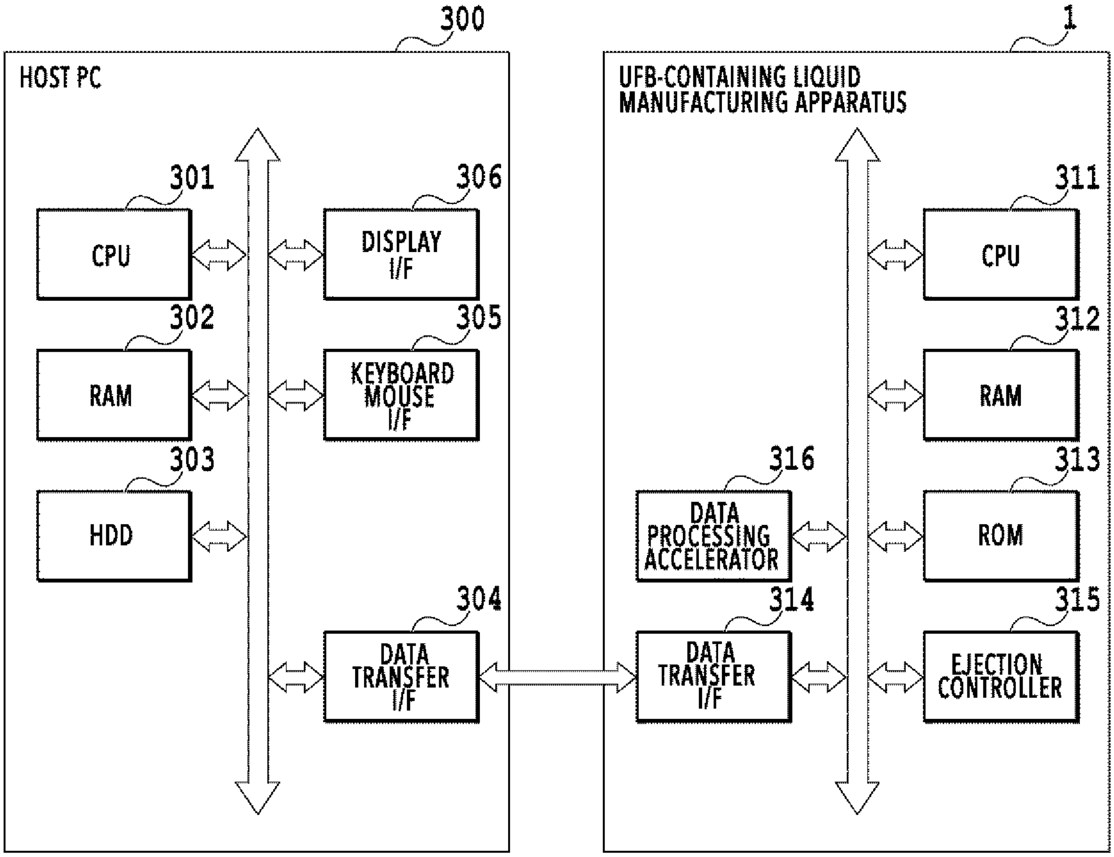

[Fig. 6]
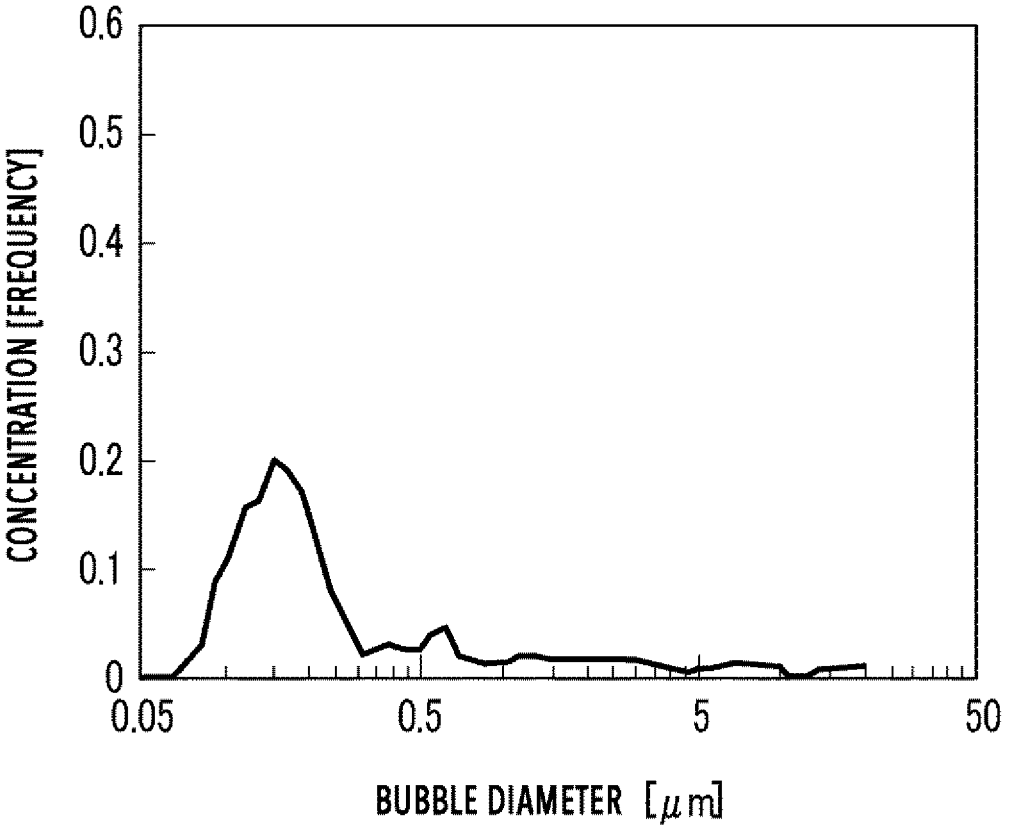
[Fig. 7A]
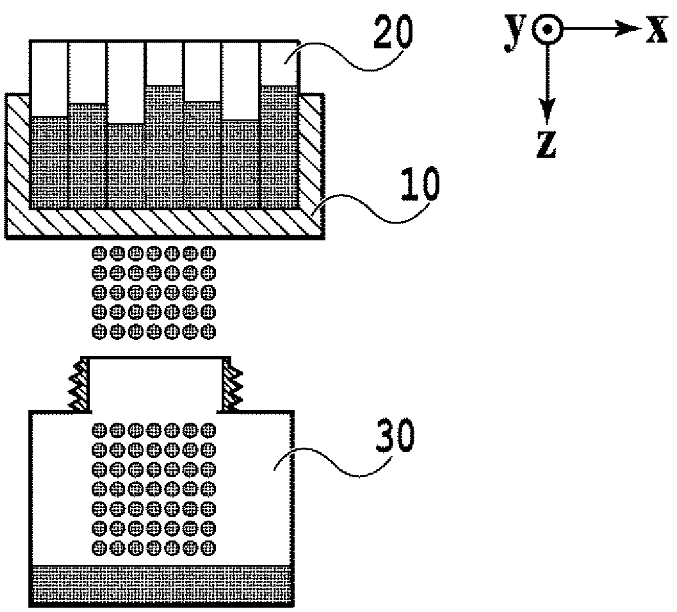

[Fig. 7B]
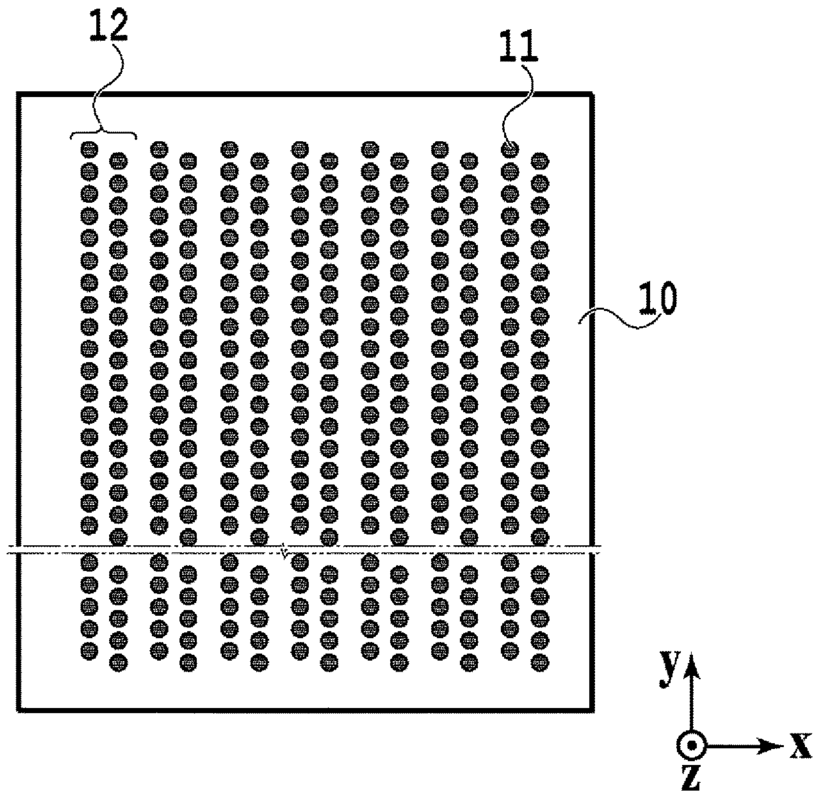
[Fig. 8A]
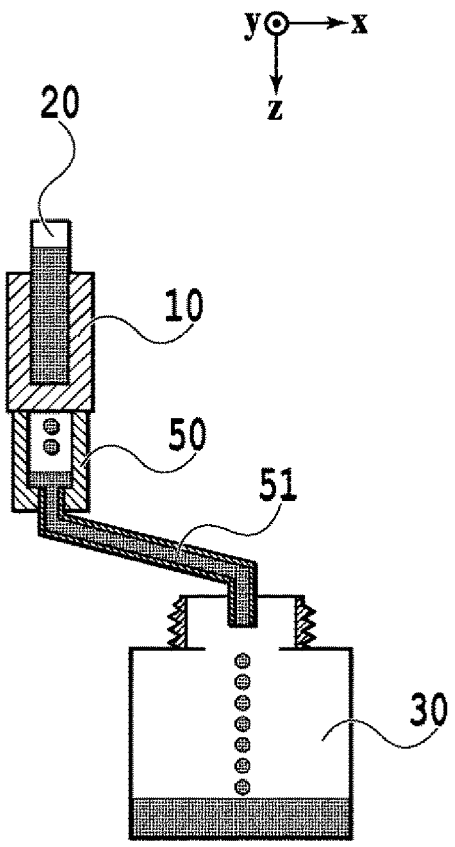

[Fig. 8B]
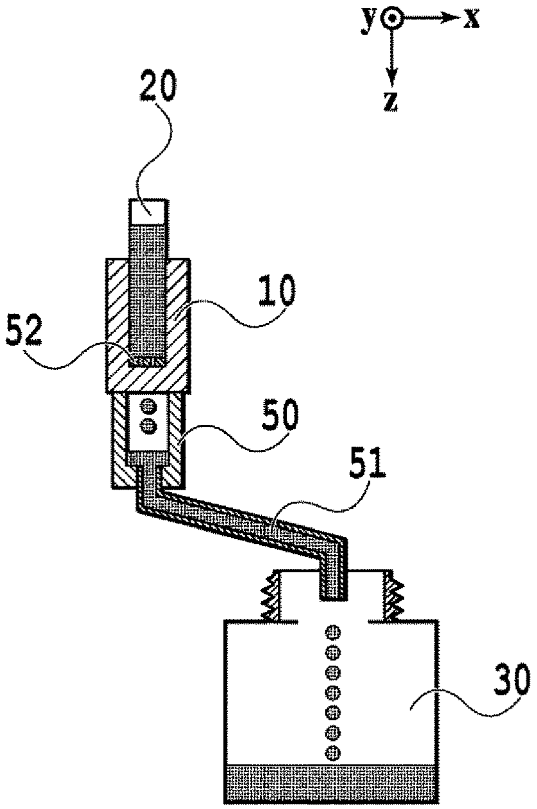
[Fig. 8C]
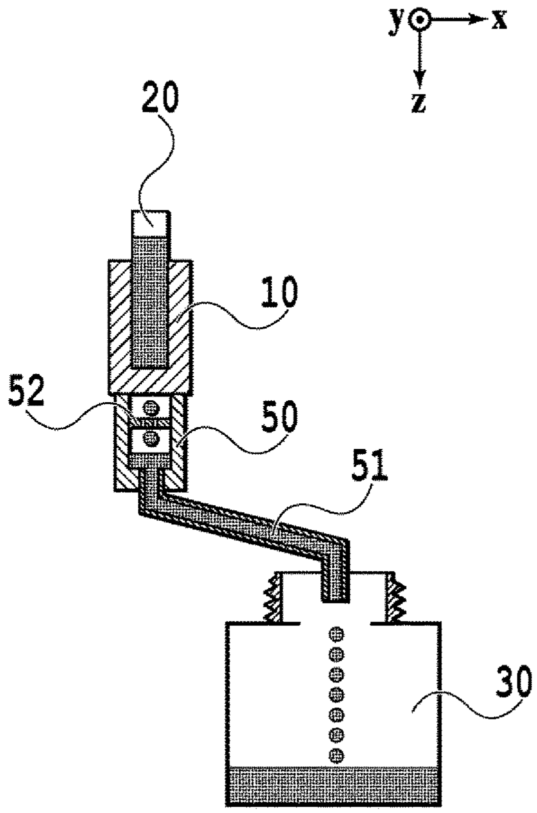

[Fig. 9A]
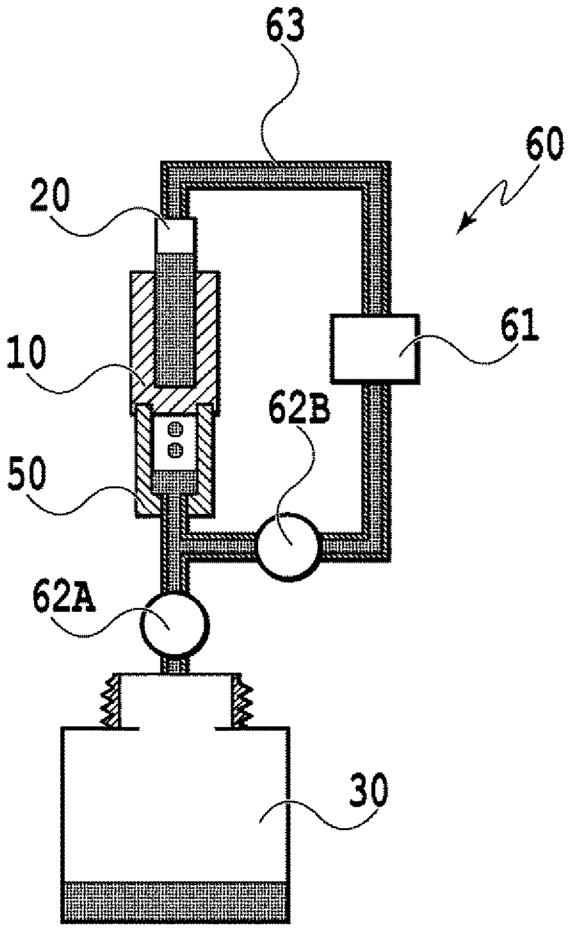

[Fig. 9B]
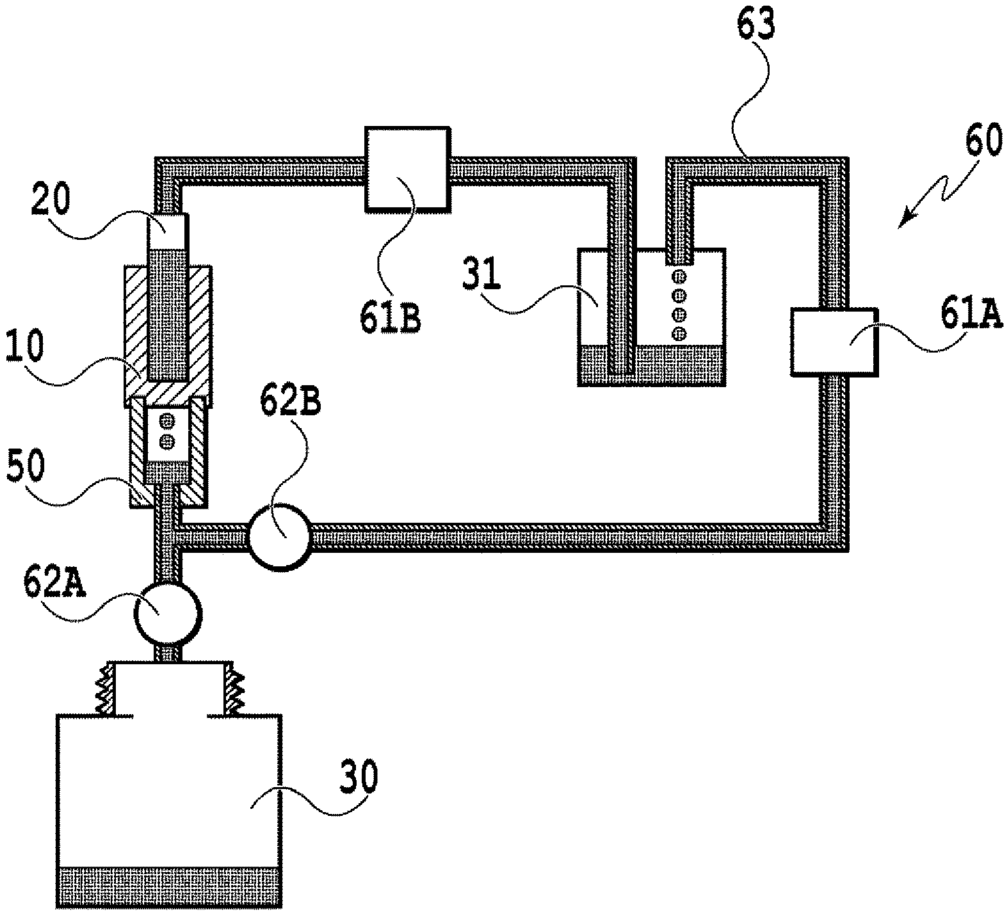
[Fig. 10A]
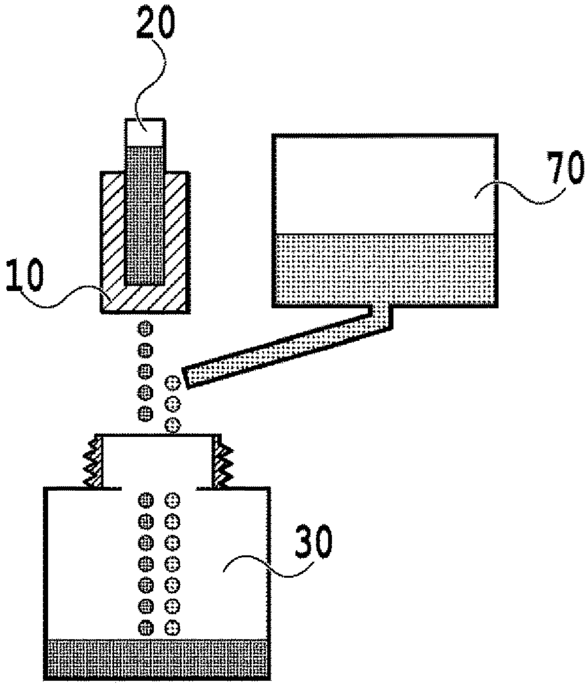

[Fig. 10B]
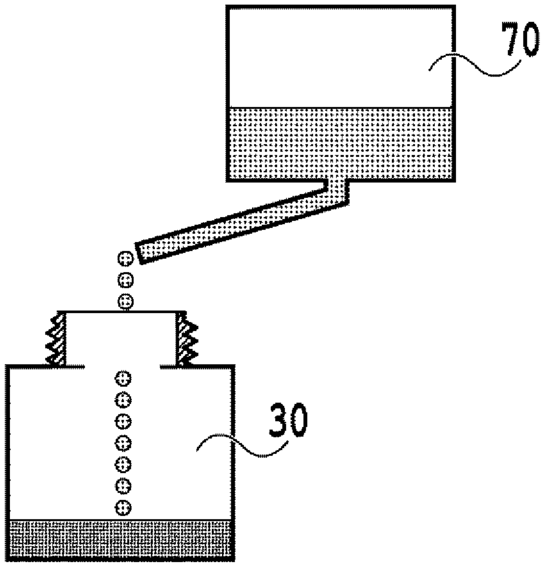
[Fig. 10C]
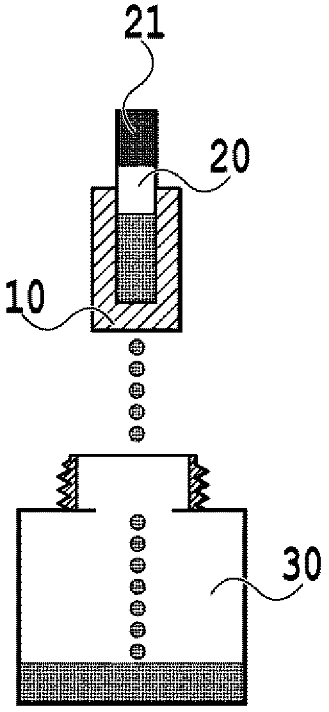

[Fig. 10D]
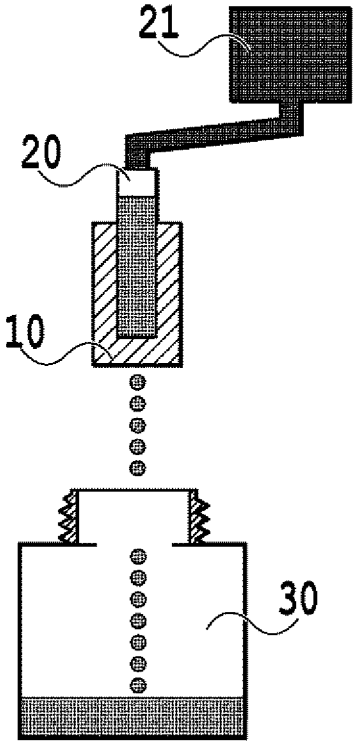
[Fig. 11A]
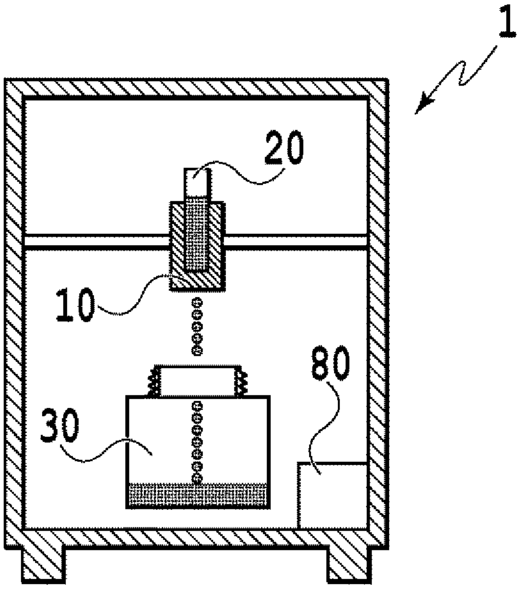

[Fig. 11B]
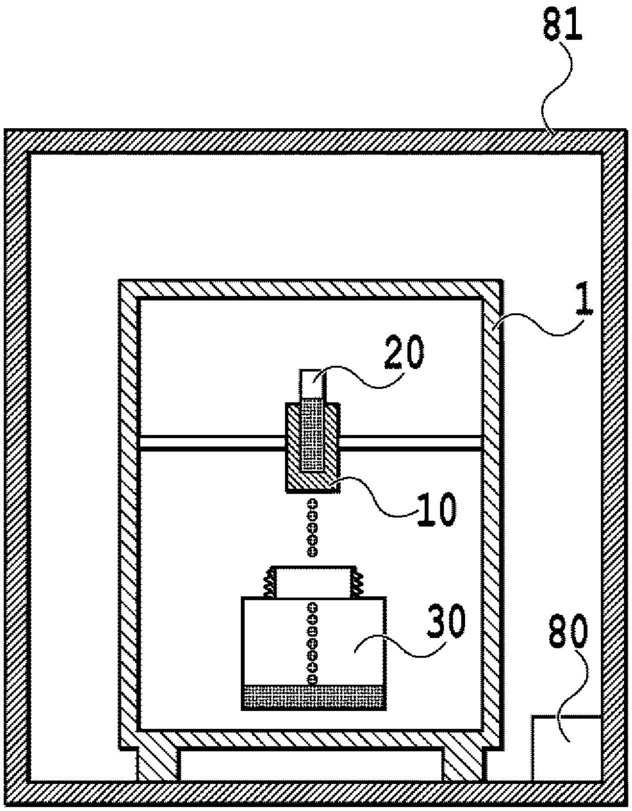
[Fig. 12A]
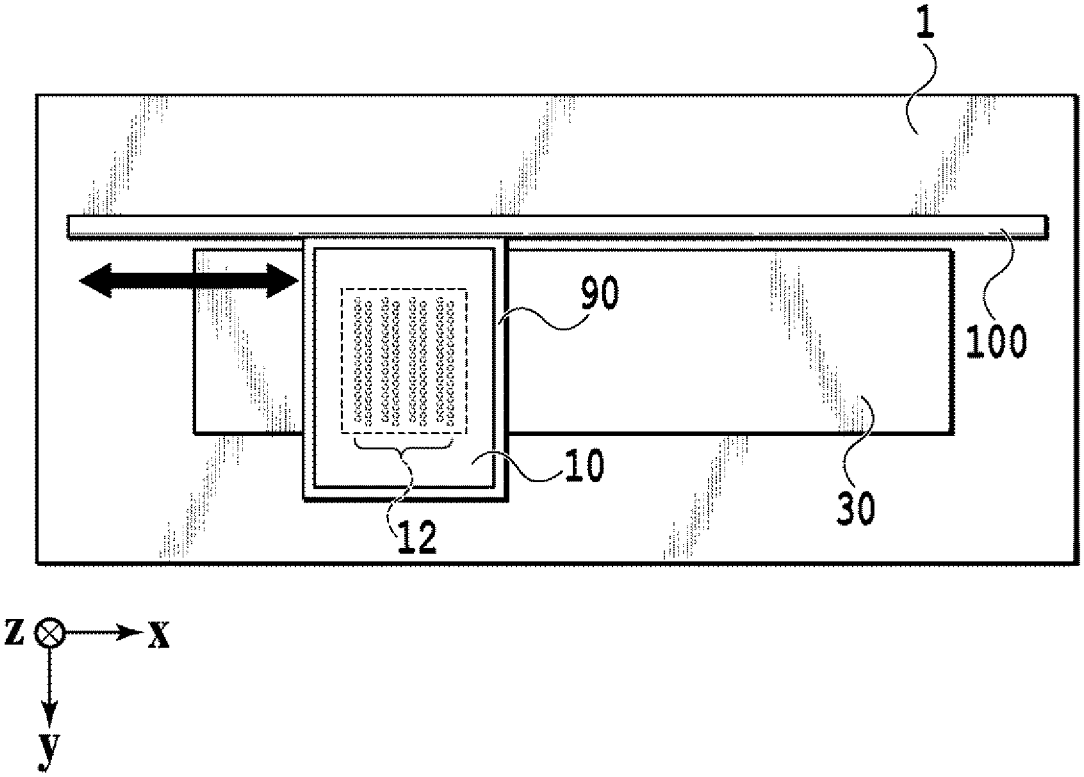

[Fig. 12B]
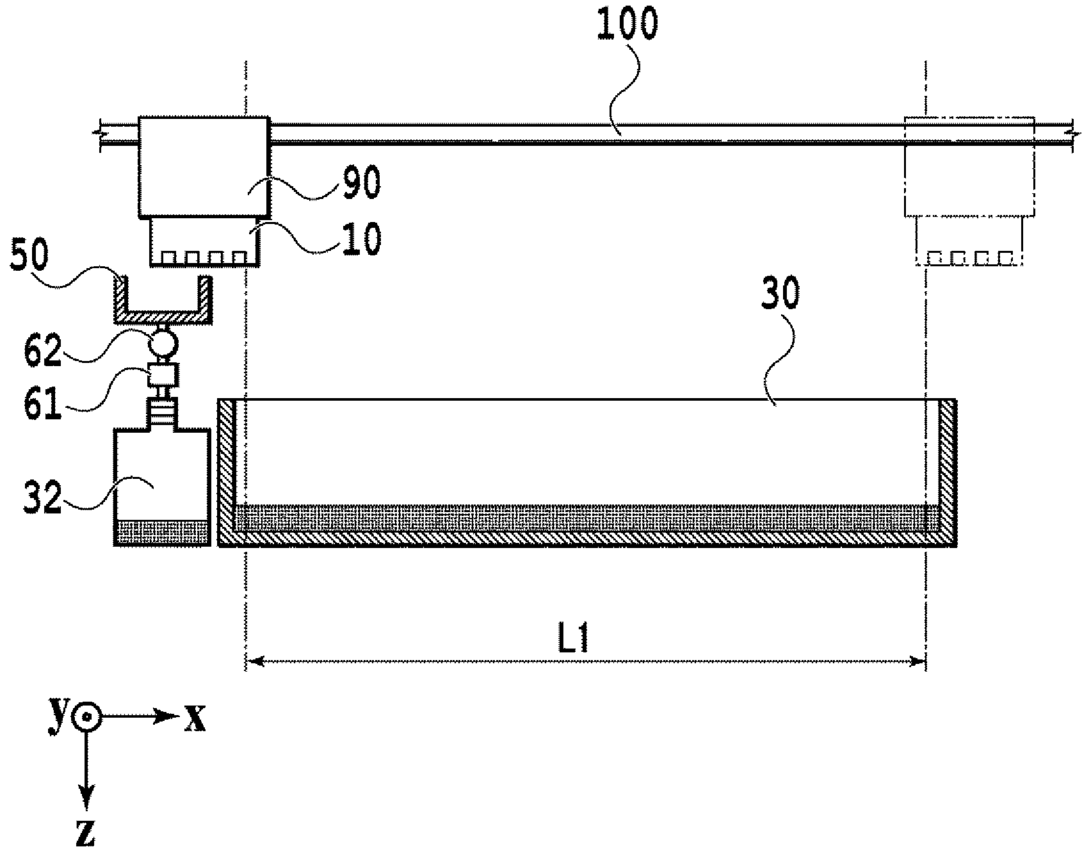
[Fig. 13A]
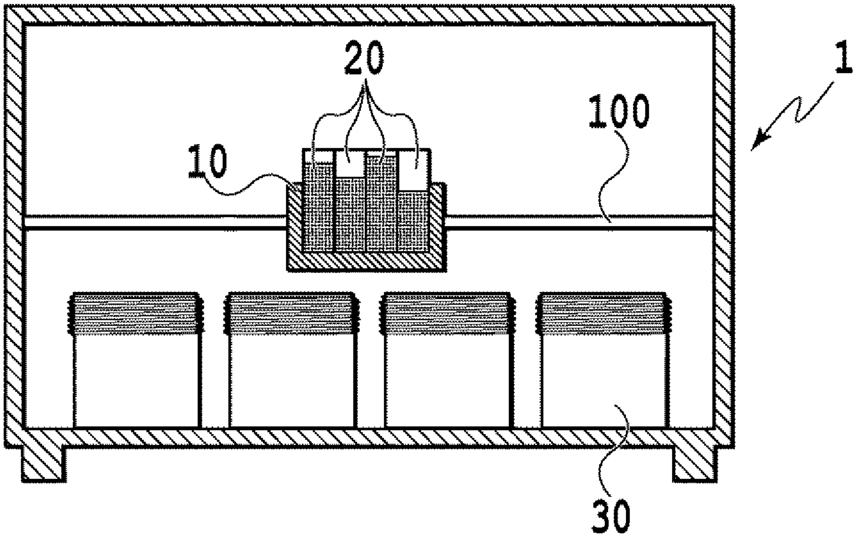

[Fig. 13B]
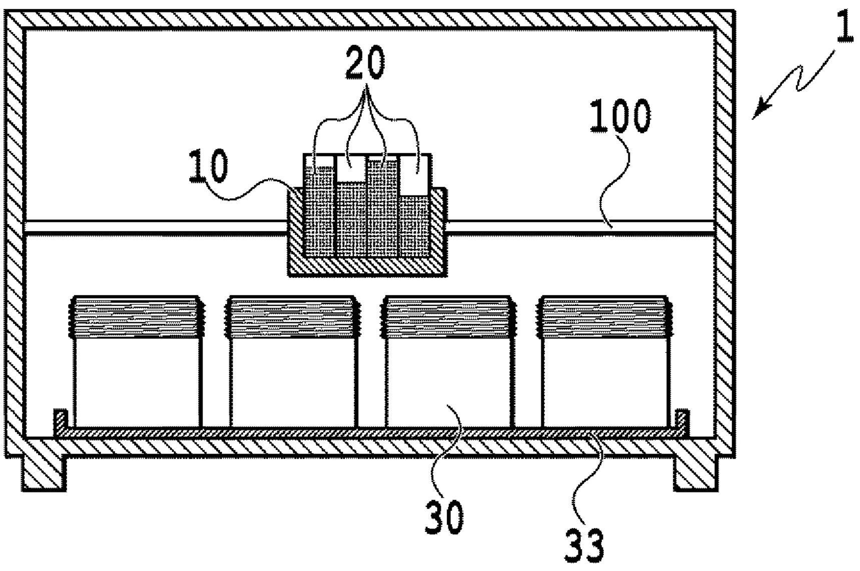
[Fig. 14]
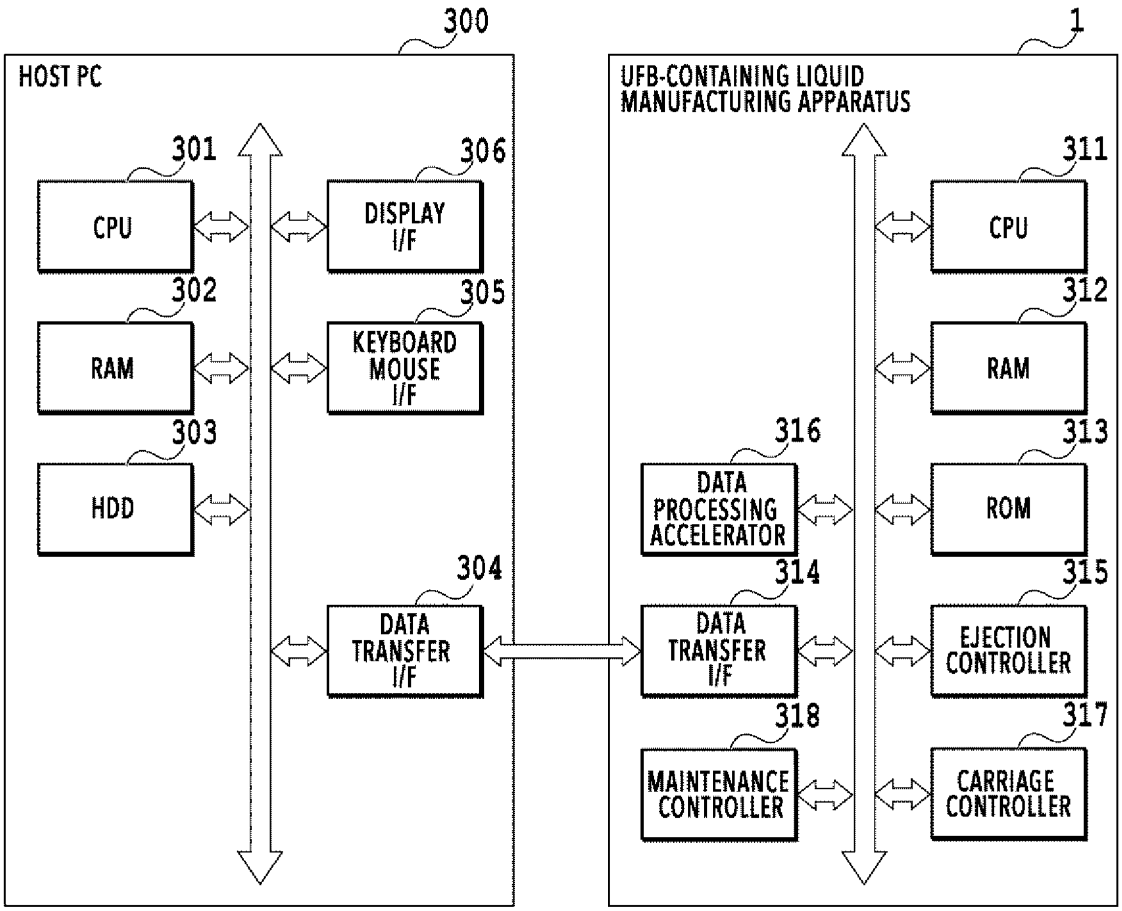

[Fig. 15A]

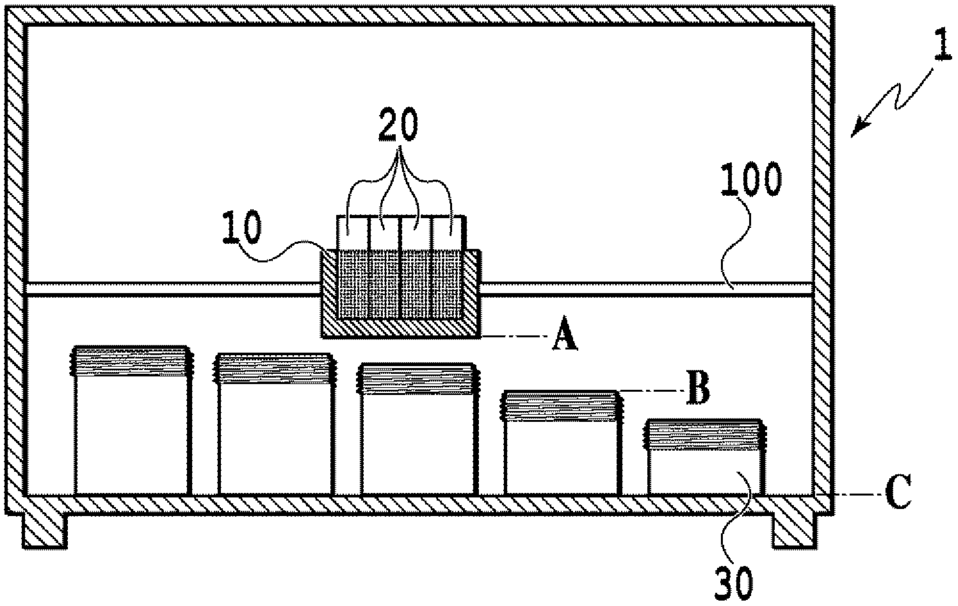

[Fig. 15B]

| | | | | | |
|---|---|---|---|---|---|
| [A-B DISTANCE] DISTANCE BETWEEN EJECTION OPENING SURFACE (A) AND COLLECTION PORT (B) | 1mm | 5mm | 10mm | 30mm | 50mm |
| [B-C DISTANCE] DISTANCE BETWEEN COLLECTION PORT (B) AND BOTTOM SURFACE OF COLLECTION CONTAINER (C) | 59mm | 55mm | 50mm | 30mm | 10mm |
| [A-C DISTANCE] DISTANCE BETWEEN EJECTION OPENING SURFACE (A) AND BOTTOM SURFACE OF COLLECTION CONTAINER (C) | 60mm | 60mm | 60mm | 60mm | 60mm |
| VOLUME OF COLLECTED UFB-CONTAINING LIQUID | 400ml | 350ml | 250ml | 150ml | 100ml |

[Fig. 16A]

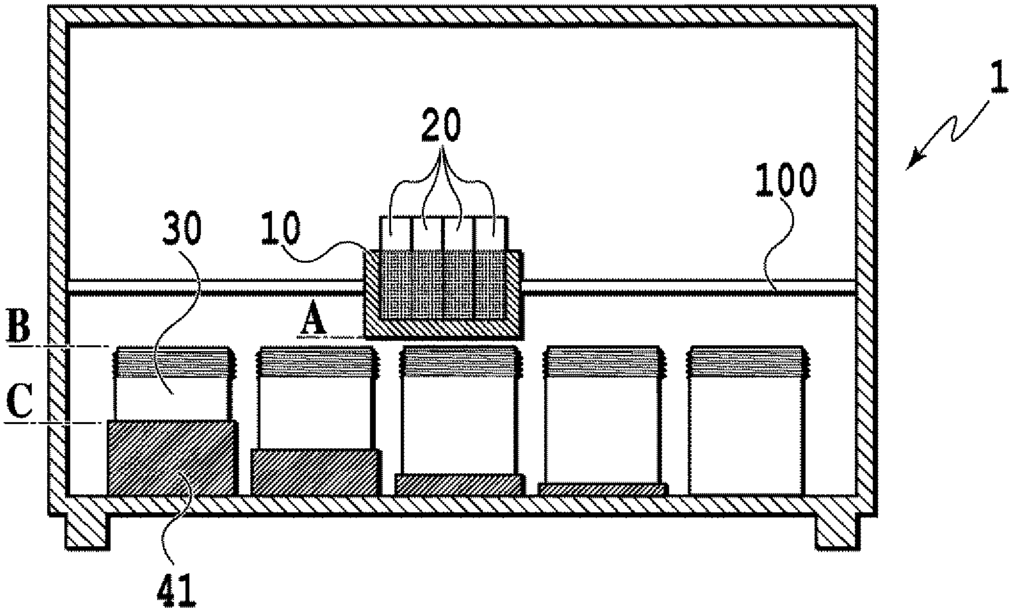

[Fig. 16B]

| | | | | | |
|---|---|---|---|---|---|
| [A-B DISTANCE] DISTANCE BETWEEN EJECTION OPENING SURFACE (A) AND COLLECTION PORT (B) | 5mm | 5mm | 5mm | 5mm | 5mm |
| [B-C DISTANCE] DISTANCE BETWEEN COLLECTION PORT (B) AND BOTTOM SURFACE OF COLLECTION CONTAINER (C) | 25mm | 55mm | 65mm | 75mm | 95mm |
| [A-C DISTANCE] DISTANCE BETWEEN EJECTION OPENING SURFACE (A) AND BOTTOM SURFACE OF COLLECTION CONTAINER (C) | 30mm | 60mm | 70mm | 80mm | 100mm |
| VOLUME OF COLLECTED UFB-CONTAINING LIQUID | 420ml | 370ml | 200ml | 150ml | 100ml |

[Fig. 17A]
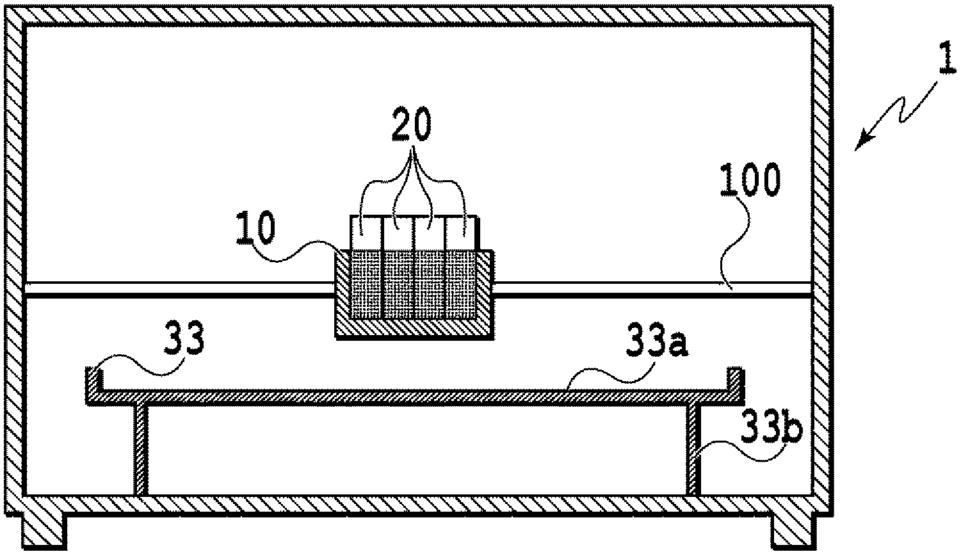
[Fig. 17B]
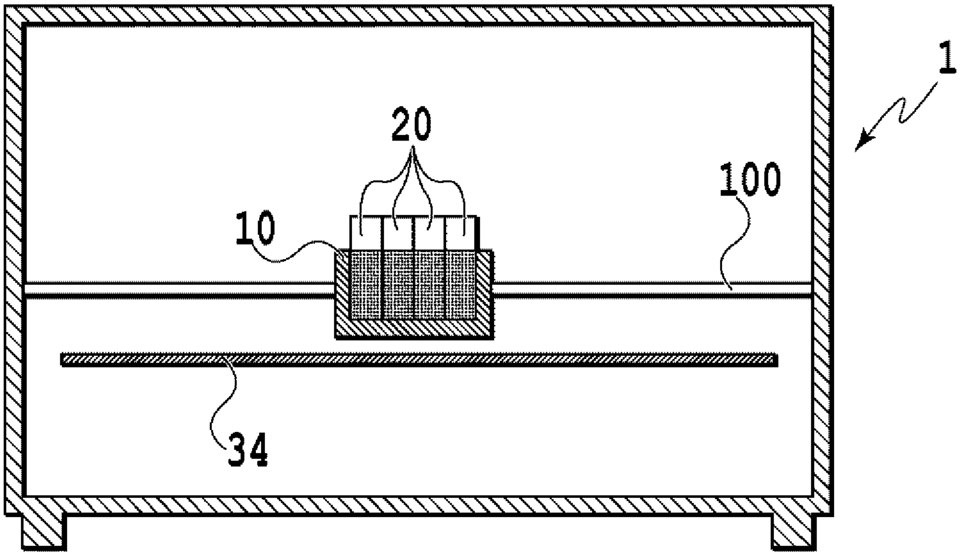

[Fig. 18A]
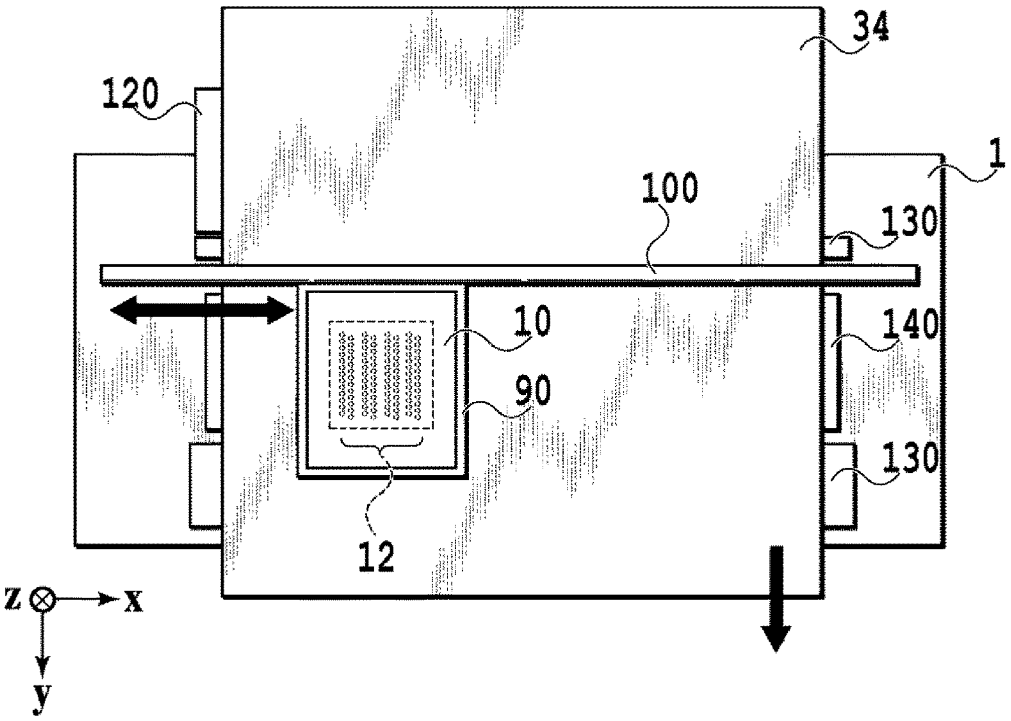
[Fig. 18B]
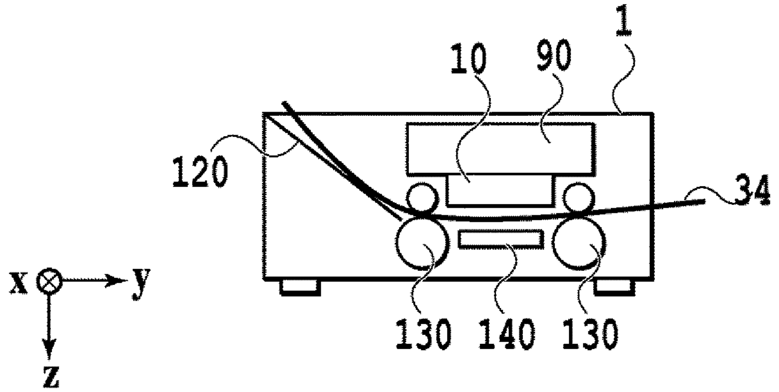
[Fig. 18C]
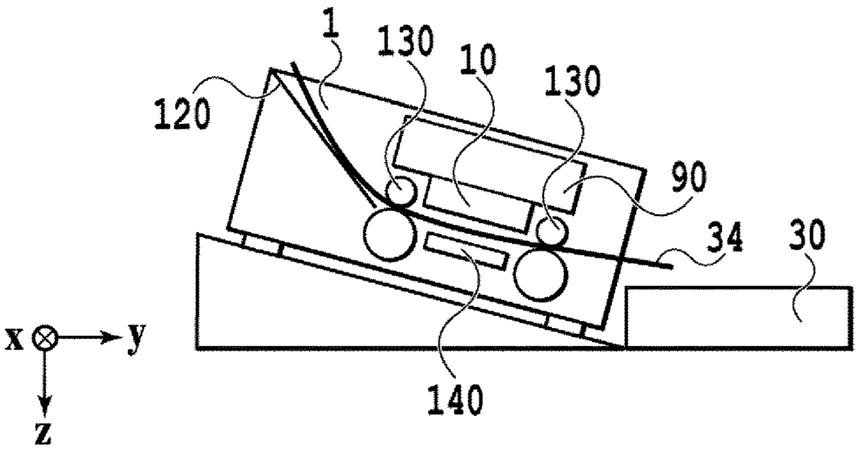

[Fig. 19A]
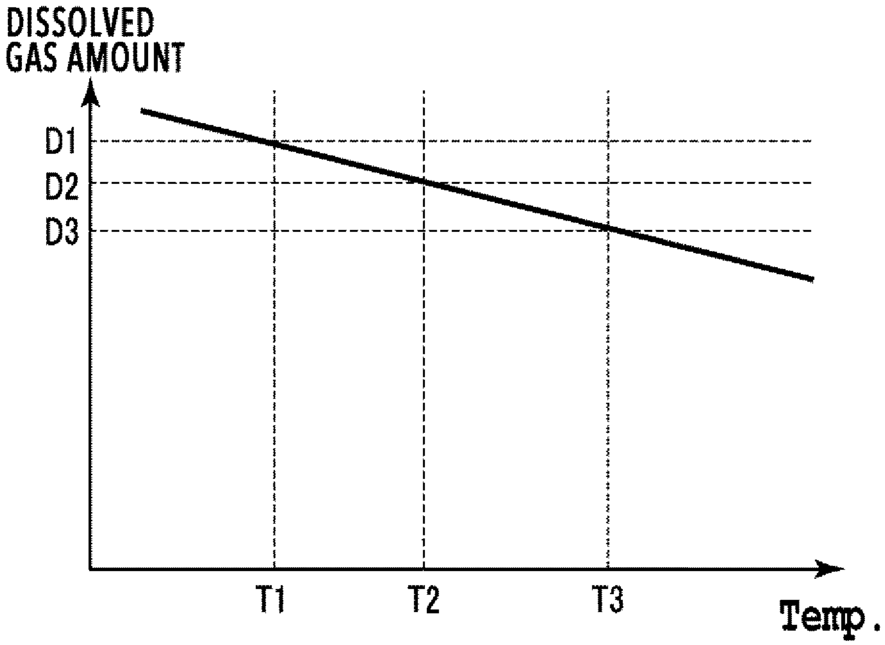
[Fig. 19B]
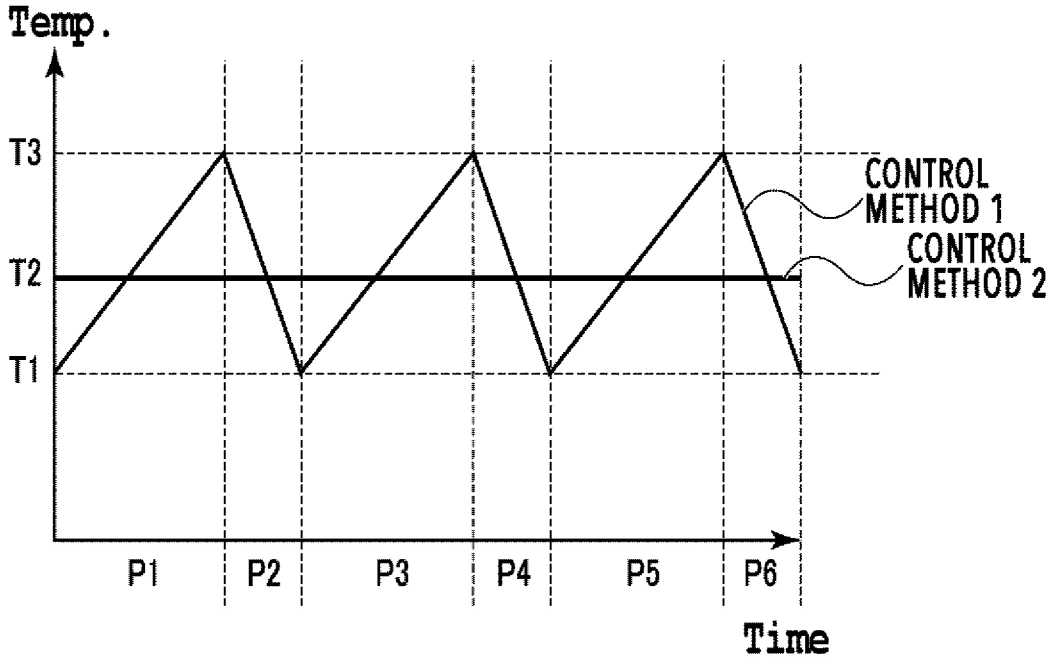

[Fig. 20A]
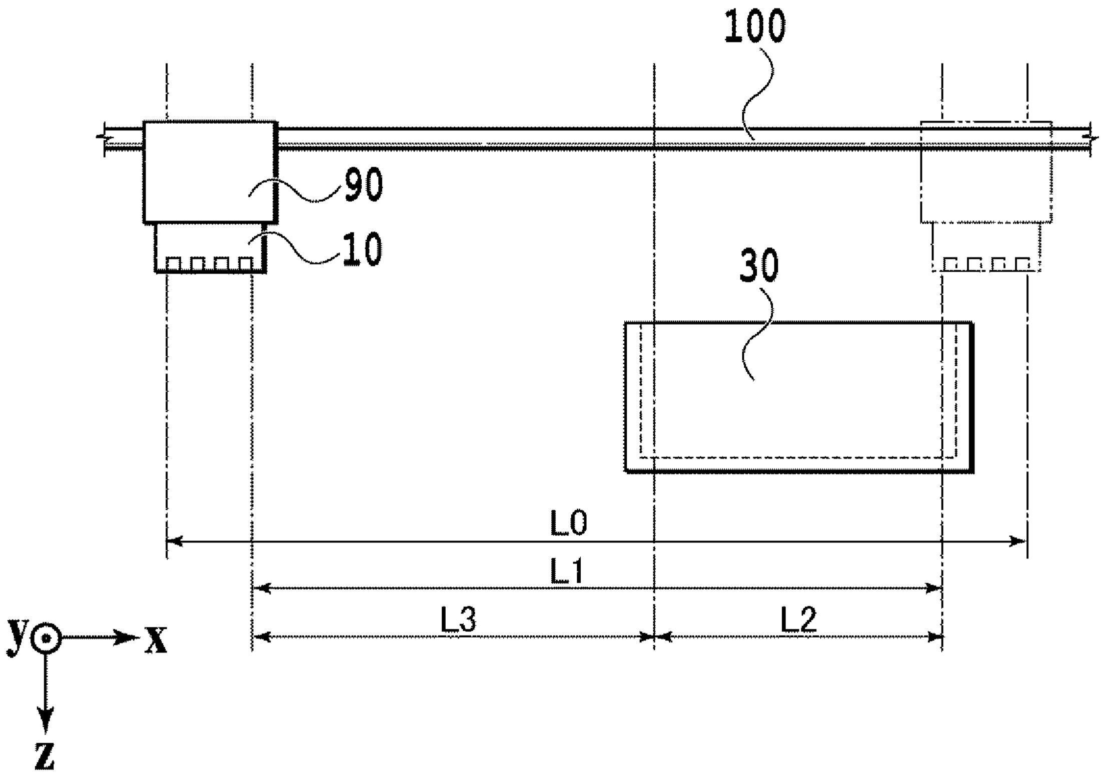
[Fig. 20B]
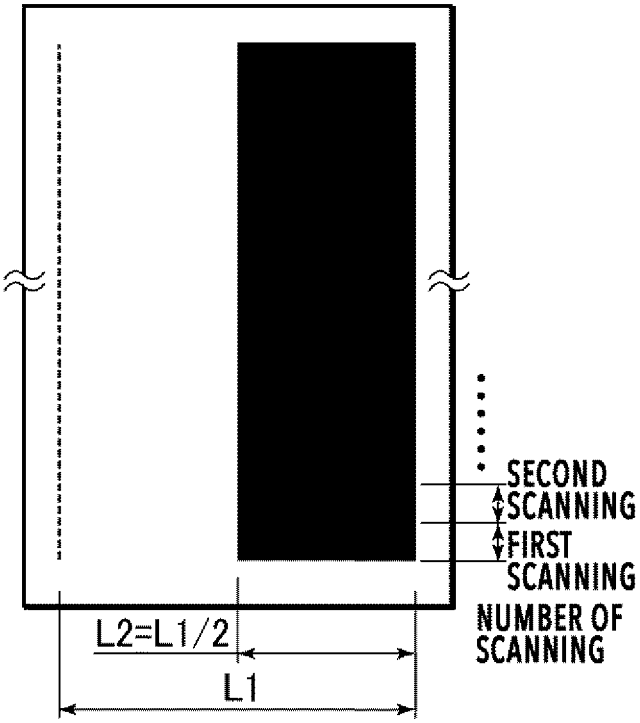

[Fig. 20C]
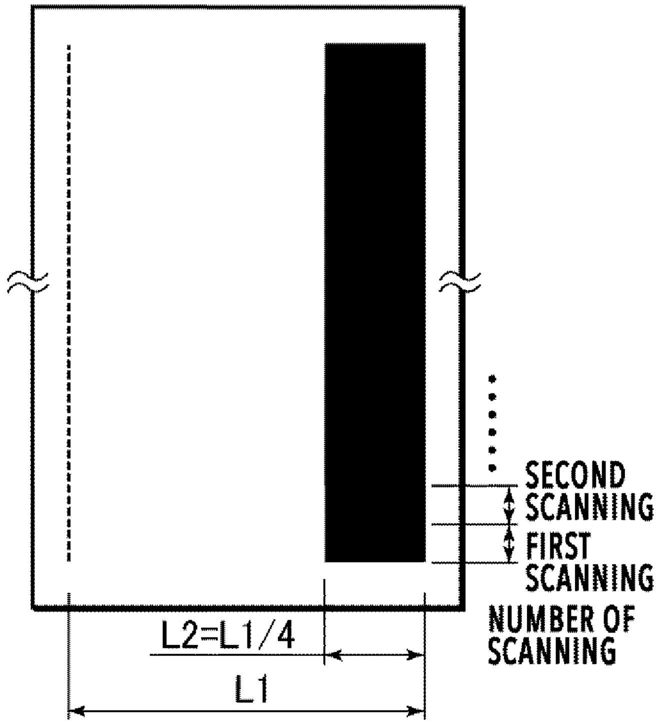
[Fig. 21A]
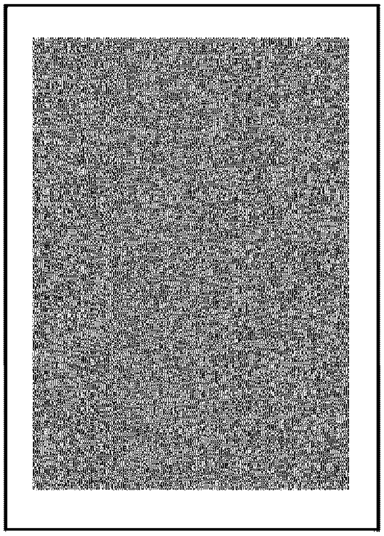

[Fig. 21B]
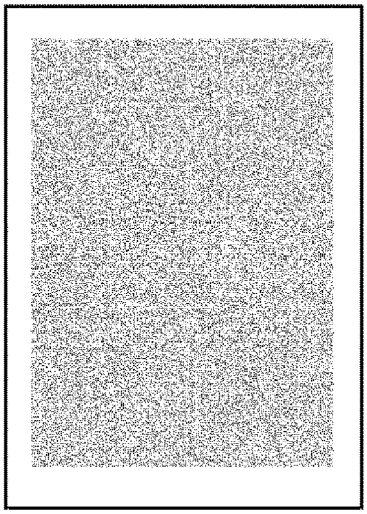
[Fig. 22A]
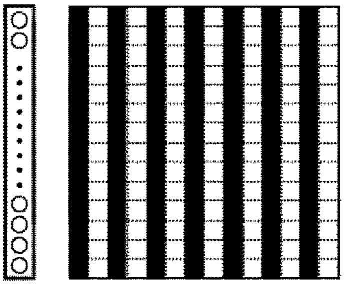
[Fig. 22B]
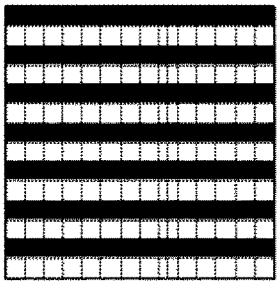
[Fig. 22C]
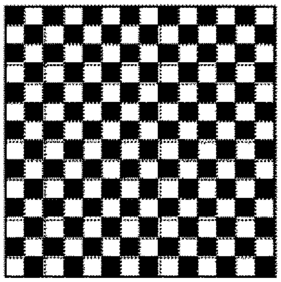

[Fig. 22D]
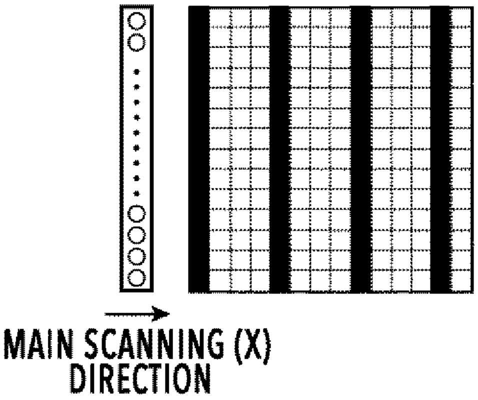
[Fig. 22E]
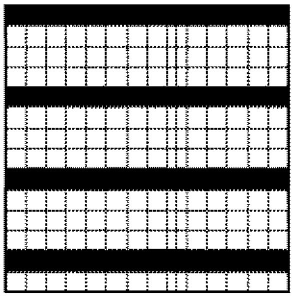
[Fig. 22F]
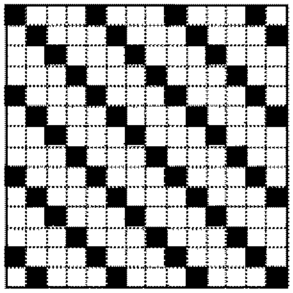

[Fig. 23A]
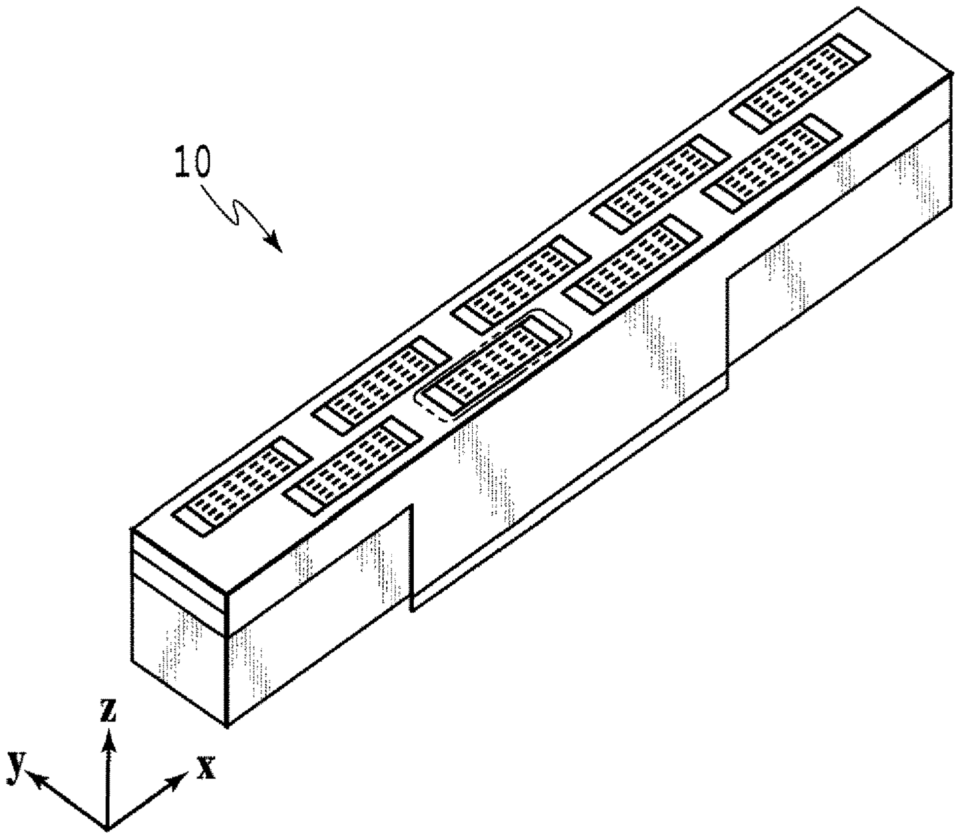
[Fig. 23B]
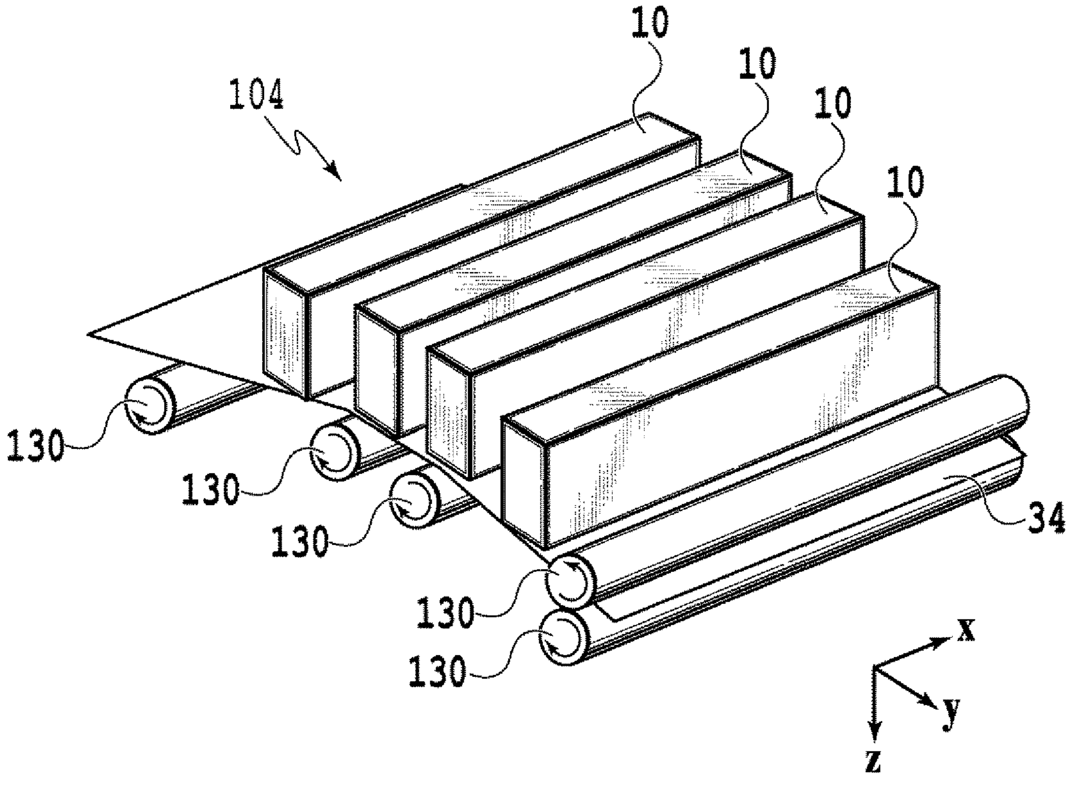

[Fig. 24]
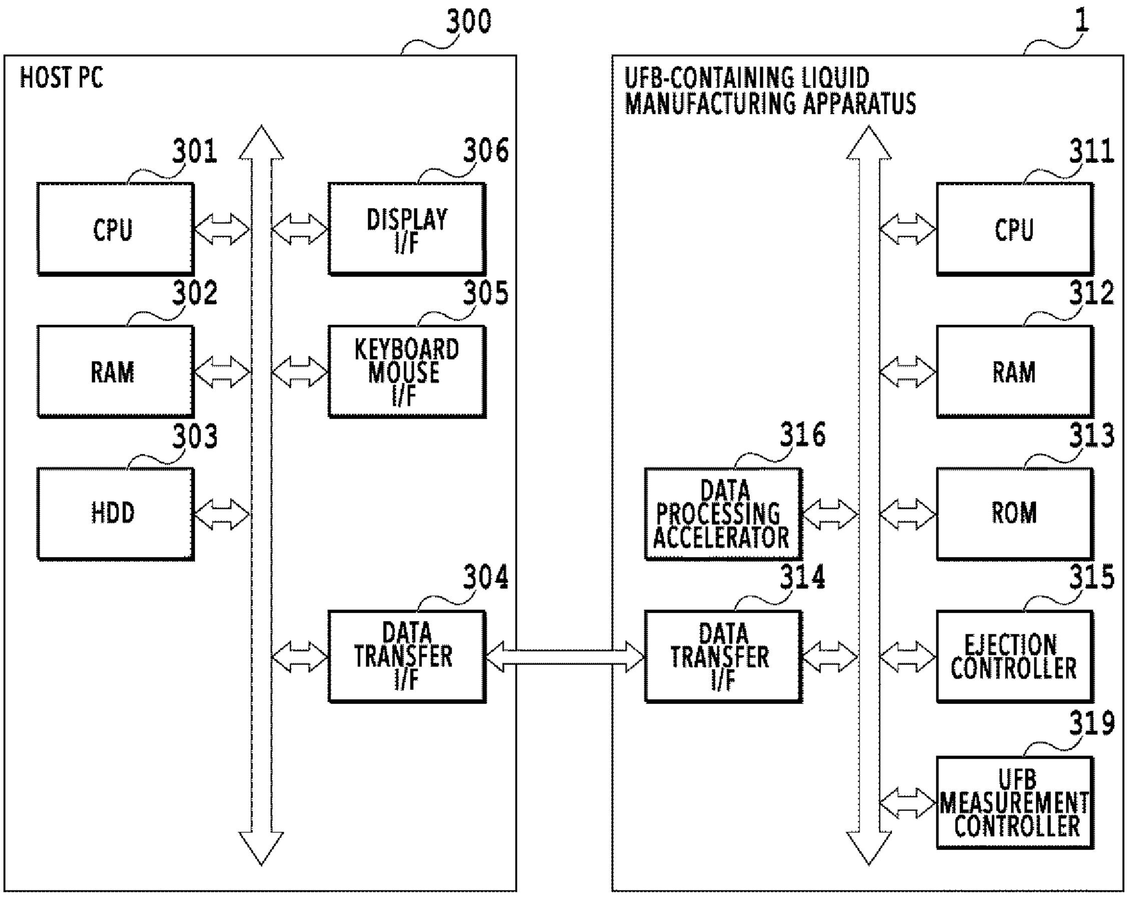

ULTRAFINE BUBBLE-CONTAINING LIQUID MANUFACTURING APPARATUS AND MANUFACTURING METHOD

TECHNICAL FIELD

The present invention relates to an apparatus and method for manufacturing liquid containing fine bubbles, particularly, ultrafine bubbles with a diameter of less than 1.0 μm.

BACKGROUND ART

In recent years, techniques of applying the characteristics of fine bubbles such as microbubbles with a microscale diameter and nanobubbles with a nanoscale diameter have been developed. In particular, the benefit of ultrafine bubbles (hereinafter also referred to as "UFBs") with a diameter of less than 1.0 μm has been confirmed in various fields, and there is an increasing need for liquid containing UFBs with a high purity.

PTL 1 discloses an apparatus that generates fine bubbles by subjecting gas to pressure dissolution by means of a pressure dissolution method to generate pressurized liquid and emitting a jet of the pressurized liquid from a nozzle. PTL 2 discloses an apparatus that generates fine bubbles by repeating diversion and confluence of a liquid-gas mixture by means of a mixing unit.

CITATION LIST

Patent Literature

PTL 1: Japanese Patent Laid-Open No. 6118544
PTL 2: Japanese Patent Laid-Open No. 4456176

SUMMARY OF INVENTION

Technical Problem

However, if liquid containing UFBs is manufactured by using PTL 1 or PTL 2, there are also generated a large number of millibubbles with a milliscale diameter and microbubbles with a microscale diameter. For this reason, to increase a purity of UFBs, it is needed to leave the bubble-containing liquid after the manufacture and wait for the millibubbles and microbubbles to disappear by floating in the air with buoyancy or by collapsing in the water. However, it is confirmed that also the UFBs themselves gradually disappear by being mixed with the millibubbles and microbubbles.

Furthermore, in the apparatus disclosed in PTL 1, liquid needs to have a high pressure between 0.5 and 0.6 MPa, and in the apparatus disclosed in PTL 2, liquid needs to have a high pressure of about 30 atm, where flow paths are also complicated. In other words, to manufacture a UFB-containing liquid by using PTL 1 or PTL 2, a large-scale complex apparatus having a large power consumption is required, and a long time is required for obtaining a UFB-containing liquid having a high purity.

The present invention has been made to solve the above problem. Accordingly, an object of the present invention is to provide a UFB-containing liquid manufacturing apparatus having a relatively small and simple configuration and capable of manufacturing a UFB-containing liquid having a high purity in a short period of time, and a method therefor.

Solution to Problem

Accordingly, the present invention is characterized by including a liquid ejecting unit having a thermal energy generating element, a flow path for leading liquid to the thermal energy generating element, a driving unit configured to drive the thermal energy generating element and cause film boiling in liquid led to the flow path, and an ejection opening for ejecting liquid containing ultrafine bubbles generated by the film boiling and a collecting unit configured to collect liquid ejected from the ejection opening.

Advantageous Effects of Invention

According to the present invention, with a relatively small and simple configuration, it is possible to manufacture a UFB-containing liquid having a high purity in a short period of time.

Further features of the present invention will become apparent from the following description of exemplary embodiments with reference to the attached drawings.

BRIEF DESCRIPTION OF DRAWINGS

FIG. 1A is a diagram showing a heating resistor substrate and a UFB generating mechanism;

FIG. 1B is a diagram showing a heating resistor substrate and a UFB generating mechanism;

FIG. 2A is a diagram illustrating a mechanism of ejecting a UFB-containing liquid by using film boiling;

FIG. 2B is a diagram illustrating a mechanism of ejecting a UFB-containing liquid by using film boiling;

FIG. 2C is a diagram illustrating a mechanism of ejecting a UFB-containing liquid by using film boiling;

FIG. 2D is a diagram illustrating a mechanism of ejecting a UFB-containing liquid by using film boiling;

FIG. 2E is a diagram illustrating a mechanism of ejecting a UFB-containing liquid by using film boiling;

FIG. 2F is a diagram illustrating a mechanism of ejecting a UFB-containing liquid by using film boiling;

FIG. 3A is a diagram illustrating a mechanism of ejecting a UFB-containing liquid by using film boiling;

FIG. 3B is a diagram illustrating a mechanism of ejecting a UFB-containing liquid by using film boiling;

FIG. 3C is a diagram illustrating a mechanism of ejecting a UFB-containing liquid by using film boiling;

FIG. 3D is a diagram illustrating a mechanism of ejecting a UFB-containing liquid by using film boiling;

FIG. 3E is a diagram illustrating a mechanism of ejecting a UFB-containing liquid by using film boiling;

FIG. 4A is a schematic configuration diagram showing a UFB-containing liquid manufacturing apparatus and a liquid ejecting unit used in a first embodiment;

FIG. 4B is a schematic configuration diagram showing the UFB-containing liquid manufacturing apparatus and the liquid ejecting unit used in the first embodiment;

FIG. 5 is a block diagram for explaining a control configuration in the first embodiment;

FIG. 6 is a graph showing a particle size frequency distribution of bubbles present in liquid;

FIG. 7A is a schematic diagram showing a liquid ejecting unit and a collection container used in Modification 1;

FIG. 7B is a schematic diagram showing the liquid ejecting unit and the collection container used in Modification 1;

FIG. 8A is a schematic diagram showing a liquid ejecting unit and a collection container used in Modification 2;

FIG. 8B is a schematic diagram showing the liquid ejecting unit and the collection container used in Modification 2;

FIG. 8C is a schematic diagram showing the liquid ejecting unit and the collection container used in Modification 2;

FIG. 9A is a diagram showing Modification 3 in which a circulation system is provided;

FIG. 9B is a diagram showing Modification 3 in which a circulation system is provided;

FIG. 10A is a diagram showing Modification 4 in which a function of formulating a UFB-containing liquid is provided;

FIG. 10B is a diagram showing Modification 4 in which a function of formulating a UFB-containing liquid is provided;

FIG. 10C is a diagram showing Modification 4 in which a function of formulating a UFB-containing liquid is provided;

FIG. 10D is a diagram showing Modification 4 in which a function of formulating a UFB-containing liquid is provided;

FIG. 11A is a diagram showing Modification 5 in which a temperature humidity control mechanism is provided;

FIG. 11B is a diagram showing Modification 5 in which a temperature humidity control mechanism is provided;

FIG. 12A is an internal configuration diagram of a UFB-containing liquid manufacturing apparatus used in a second embodiment;

FIG. 12B is an internal configuration diagram of the UFB-containing liquid manufacturing apparatus used in the second embodiment;

FIG. 13A is a diagram showing another embodiment of a collection container of the second embodiment;

FIG. 13B is a diagram showing another embodiment of a collection container of the second embodiment;

FIG. 14 is a block diagram for explaining a control configuration in the second embodiment;

FIG. 15A is a diagram illustrating a test experiment;

FIG. 15B is a table illustrating a test experiment;

FIG. 16A is a diagram illustrating a test experiment;

FIG. 16B is a table illustrating a test experiment;

FIG. 17A is a diagram showing another example of a collection method in the second embodiment;

FIG. 17B is a diagram showing another example of a collection method in the second embodiment;

FIG. 18A is an internal configuration diagram of a UFB-containing liquid manufacturing apparatus having a sheet conveying mechanism;

FIG. 18B is an internal configuration diagram of a UFB-containing liquid manufacturing apparatus having a sheet conveying mechanism;

FIG. 18C is an internal configuration diagram of a UFB-containing liquid manufacturing apparatus having a sheet conveying mechanism;

FIG. 19A is a graph showing a relation between a temperature of a liquid ejecting unit and a dissolved gas amount and a graph showing examples of control methods;

FIG. 19B is a graph showing a relation between a temperature of a liquid ejecting unit and a dissolved gas amount and a graph showing examples of control methods;

FIG. 20A is a diagram showing a method for collecting a UFB-containing liquid and ejection data in the case of using a control method 1;

FIG. 20B is a diagram showing a method for collecting a UFB-containing liquid and ejection data in the case of using the control method 1;

FIG. 20C is a diagram showing a method for collecting a UFB-containing liquid and ejection data in the case of using the control method 1;

FIG. 21A is a diagram showing ejection data in the case of using a control method 2;

FIG. 21B is a diagram showing ejection data in the case of using the control method 2;

FIG. 22A is a diagram showing ejection data in the case of using the control method 2;

FIG. 22B is a diagram showing ejection data in the case of using the control method 2;

FIG. 22C is a diagram showing ejection data in the case of using the control method 2;

FIG. 22D is a diagram showing ejection data in the case of using the control method 2;

FIG. 22E is a diagram showing ejection data in the case of using the control method 2;

FIG. 22F is a diagram showing ejection data in the case of using the control method 2;

FIG. 23A is an internal configuration diagram of a liquid ejecting unit and an apparatus used in a third embodiment;

FIG. 23B is an internal configuration diagram of the liquid ejecting unit and the apparatus used in the third embodiment; and FIG. 24 is a block diagram for explaining a control configuration in another embodiment.

DESCRIPTION OF EMBODIMENTS

FIG. 1A is a cross-sectional view of an example of a heating resistor substrate that can be used in the present invention to manufacture a UFB-containing liquid. In a heating resistor substrate 200, a thermal oxide film 202 as a heat storage layer and an interlayer film 203 serving also as a heat storage layer are laminated in this order on a surface of a silicon substrate 201. For the interlayer film 203, a SiO film, a SiN film, and the like are used. On part of the surface of the interlayer film 203, a resistive layer 204 is formed, and further, on part of the surface of the resistive layer 204, wiring 205 is formed. For the resistive layer 204, TaSiN, WSiN, and the like are used, and for the wiring 205, Al alloy wiring composed of Al, Ai—Si, Al—Cu, or the like is used. A protective layer 206 composed of SiN, SiO, or the like is formed so as to cover the wiring 205, the resistive layer 204, and the interlayer film 203. Furthermore, on the surface of the protective layer 206 in and around an area corresponding to a heat acting portion 208, an anti-cavitation film 207 is formed to protect the protective layer 206 from chemical and physical impact on the heat acting portion 208. For the anti-cavitation film 207, metal selected from Ta, Fe, Ni, Cr, Ru, Zr, Ir, or the like is used.

In such a configuration, if a voltage is applied across both ends of the wiring 205 to pass a current through the wiring 205, the current passes through the resistive layer 204 in an area not having the wiring 205, and the resistive layer 204 is heated. That is, the area not having the wiring 205, corresponding to the heat acting portion 208, serves as a thermal energy generating element 208 on the heating resistor substrate 200.

FIG. 1B is a diagram showing a UFB generating mechanism using the heating resistor substrate 200. In the figure, a situation is shown in time sequence starting from the left, where liquid is provided on the surface of the heating resistor substrate 200 and a voltage is applied to the thermal energy generating element 208 (hereinafter referred to simply as a heater 208) for a predetermined period of time.

When the heater 208 abruptly generates heat by the application of a voltage, a bubble 920 is generated by film boiling in the liquid that is in contact with the heater 208. The bubble 920 grows as a temperature of the surface of the heater 208 increases, but the bubble 920 stops growing at some point because an internal negative pressure also increases together with the increasing volume of the bubble 920. If the application of the voltage is stopped before the bubble reaches its maximum volume, the temperature of the heater 208 decreases, the bubble 920 starts to shrink, and again the liquid comes into contact with the surface of the heater 208, whereby the bubble 920 disappears. At the time of disappearing, cavitation occurs two times: a first cavitation (impact) caused by contact between the shrunk bubble 920 and the heater 208 and a second cavitation in which small bubbles 940 remaining after the first cavitation disappear in a spark.

As a result of the testing by the present inventors, it was confirmed that driving of the heater as described above caused a bubble having a size less than 1.0 μm (a so-called ultrafine bubble, UFB) to be generated in the liquid. It was assumed that gas components dissolved in the liquid resulted are appeared as a large number of UFBs by film boiling in the liquid heated by the heater 208. Furthermore, it was confirmed that bubbles having a size greater than UFBs such as millibubbles and microbubbles had been sufficiently fewer than the UFBs since the manufacture of the UFB-containing liquid, and the number of remaining UFBs after a lapse of three months from the manufacture hardly changed. In other words, using film boiling for bubbles to form, grow, shrink, and disappear allows manufacturing of a UFB-containing liquid having a high purity with a relatively simple configuration and in a short period of time. In addition, if the UFB-containing liquid can be ejected outside by using the growth and shrinkage of bubbles, it is possible to continuously manufacture and collect a UFB-containing liquid having a desired purity.

FIG. 2A to FIG. 2F are diagrams for explaining a mechanism of ejecting a UFB-containing liquid by using film boiling. FIG. 2A to FIG. 2F are cross-sectional views of a liquid ejecting mechanism configured by further laminating a flow path member 13 on the heating resistor substrate 200 described with reference to FIG. 1A and FIG. 1B. A flow path 14 for leading the liquid to the heater 208 is provided inside the flow path member 13, and an ejection opening 11 that is in communication with atmosphere is formed in a position opposite to the heater 208.

Only one heater 208 is shown in the figures, but multiple heaters 208 are arranged at predetermined pitches on the heating resistor substrate 200, and one flow path 14 and one ejection opening 11 are prepared for each one of the heaters 208. The plurality of flow paths 14 are connected to a common liquid chamber (not shown) for commonly supplying liquid to the flow paths 14, and the liquid in the common liquid chamber is led to the ejection opening 11 by a capillary force of the flow path 14. The led liquid forms a concave meniscus near the ejection opening 11.

If a voltage is applied and the heater 208 generates heat, film boiling occurs and the bubble 920 is generated (FIG. 2A). At this time, the temperature of the heater 208 has reached 300° C. or higher. As the temperature increases, the bubble 920 becomes larger, and the liquid comes to a state where it is about to be extruded from the ejection opening 11 (FIG. 2B). If the application of a voltage is stopped at a point when the bubble 920 grows to reach a certain size, the bubble shrinks rapidly due to an internal negative pressure. However, since the liquid extending out of the ejection opening 11 tends to be led from the ejection opening 11 with its inertial force, the liquid is split near the ejection opening 11 (FIG. 2C). As a result, the liquid outside the ejection opening 11 is ejected into the atmosphere as a droplet, whereas the remaining liquid returns in the direction of the flow path 14 (FIG. 2D).

Then, the bubble 920 shrinks, and cavitation occurs two times as described with reference to FIG. 1B on the surface of the heater 208. Near the ejection opening 11, the meniscus is vibrated between a returning force along with the shrinkage and a capillary force of supply of a new liquid, and becomes stable soon (FIG. 2E, FIG. 2F). In each driving of the heater, that is, through a process of one cycle of bubbles to form, grow, shrink, and disappear as described above, UFBs are generated inside the flow path 14, and the liquid containing the UFBs is ejected from the ejection opening 11 by the following driving of the heater.

FIG. 3A to FIG. 3E are diagrams for explaining an ejection method that is different from FIG. 2A to FIG. 2F. The processes in FIG. 3A and FIG. 3B are substantially the same as the processes in FIG. 2A and FIG. 2B. In the present method, as shown in FIG. 3C, a volume of the bubble 920 is increased until the bubble 920 partially extends out of the ejection opening 11. That is, a voltage, a voltage application time, a size of a heater, a liquid viscosity, a height of a flow path, and the like are adjusted so that a maximum volume of the bubble 920 exceeds the ejection opening 11. Accordingly, in the liquid, the grown bubble 920 extends out of the ejection opening 11, and gas in the bubble 920 comes into communication with atmosphere. This communication allows a droplet 930 to be ejected from the ejection opening 11 (FIG. 3D).

After that, the bubble 920 shrinks, and cavitation occurs two times as described with reference to FIG. 1B on the surface of the heater 208. Near the ejection opening 11, the meniscus becomes stable sooner than the case shown in FIG. 2A to FIG. 2F, and a great number of UFBs are generated in the flow path 14 (FIG. 3E). Then, the liquid containing the UFBs is ejected from the ejection opening 11 by the following driving of the heater.

It should be noted that FIG. 2A to FIG. 2F and FIG. 3A to FIG. 3E show the aspects in which each ejection opening 11 is arranged in a position opposite to the heater 208, but the present invention is not limited to these aspects. For example, the ejection opening 11 may be provided on an end of the flow path 14, and a direction in which liquid is supplied and a direction in which the droplet 930 is ejected may be the same in the heater 208. Furthermore, a direction in which bubbles grow may be opposite to a direction in which droplets are ejected, or the heater 208 may be provided in a liquid flow path in a hollow manner. In either case, periodically applying a voltage to the heater 208 while supplying the liquid to the surface of the heater 208 allows bubbles to repeat forming, growing, shrinking, and disappearing along with film boiling on the surface of the heater 208, whereby a UFB-containing liquid having a high purity can be ejected outside from the ejection opening 11. In other words, by driving the heater 208 to instantly reach a temperature of about 300° C. or higher in the liquid, bubbles are generated on the surface of the heater 208 by film boiling, and a UFB-containing liquid having a high purity can be generated.

Examples of the liquid that can be used to manufacture a UFB-containing liquid in the present invention include: pure water, ion exchange water, distilled water, bioactive water, magnetic water, lotion, tap water, seawater, river water, clean water and waste water, lake water, groundwater, rainwater, and liquid mixtures thereof. Further, a mixed solvent of water and a water-soluble organic solvent can be used. A water-soluble organic solvent mixed with water for use is not particularly limited, but for example, the following can be specifically used: alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as N-methyl-2-pyrrolidone, 2-pyrrolidone, 1,3-dimethyl-2-imidazolidinone, N,N-dimethylformamide, and N,N-dimethyl acetamide; ketones or ketoalcohols such as acetone and diacetone alcohol; cyclic ethers such as tetrahydrofuran and dioxane; glycols such as ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol; lower alkyl ethers of polyhydric alcohol such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; polyalkylene glycols such as polyethylene glycol and polypropylene glycol; and triols such as glycerol, 1,2,6-hexanetriol, and trimethylolpropane. These water-soluble organic solvents may be used singly or in combination.

[First Embodiment]

FIG. 4A and FIG. 4B are schematic configuration diagrams showing an ultrafine bubble-containing liquid manufacturing apparatus 1 (hereinafter referred to simply as an "apparatus") and a liquid ejecting unit 10 used in a first embodiment. The UFB-containing liquid manufacturing apparatus 1 of the present embodiment is mainly composed of the liquid ejecting unit 10, a tank 20, a collection container 30, and a housing 40 serving as an outer part to accommodate the components. Liquid contained in the tank 20 is supplied to the liquid ejecting unit 10, ejected by the liquid ejecting unit 10 as droplets in a Z direction, and collected by the collection container 30.

FIG. 4B is a diagram showing the liquid ejecting unit 10 as viewed from the side of an ejection opening surface. On the liquid ejecting unit 10, 768 ejection openings 11 for ejecting liquid are arranged in a Y direction in a density of 1200 dpi (dot/inch). The liquid ejecting unit 10 causes film boiling in the liquid supplied from the tank 20 by the above-described method and ejects droplets in the Z direction from each ejection opening 11 by using growing energy of generated bubbles. The ejected droplets contain a large number of UFBs and are collected by the collection container 30 placed below the liquid ejecting unit 10.

The collection container 30 used in the present embodiment is a cylindrical glass container having a diameter of 2 cm and a height of 2 cm and is provided with a helical groove 31 for screwing a cap on its upper part of about 5 mm. Accordingly, after a predetermined amount of the UFB-containing liquid is reserved in the collection container 30, if the collection container 30 is removed from the apparatus 1 and covered with a cap (not shown), it is possible to seal up the inside of the collection container 30 and carry the collection container 30.

To efficiently collect the UFB-containing liquid, it is preferable that a collection port which is an opening of the collection container 30 be wider than the ejection opening surface of the liquid ejecting unit 10 having the ejection openings 11 arranged thereon, and a distance from the ejection opening surface is preferably as short as possible. Also on the internal bottom surface of the collection container 30, a distance from the ejection opening surface is preferably as short as possible. More specifically, it is preferable that a distance between the ejection opening surface and the collection port be 50 mm or less, and a distance between the ejection opening surface and the bottom surface be 100 mm or less. In the present embodiment, the distance between the ejection opening surface and the collection port is set at 5 mm and the distance between the ejection opening surface and the bottom surface is set at 25 mm.

It should be noted that, by way of example, the aspect of covering the collection container 30 by screwing a cap has been described, but the aspect of sealing the collection container 30 is not limited to this. For example, various aspects may be employed, such as an aspect of forcing an elastic cap into the collection port, an aspect of heat-welding the collection port, an aspect of sealing the collection port by using such means as a zip, and the like.

FIG. 5 is a block diagram for explaining a control configuration of the UFB-containing liquid manufacturing apparatus 1 of the present embodiment. A host PC 300 externally connected to the UFB-containing liquid manufacturing apparatus 1 generates data for driving the UFB-containing liquid manufacturing apparatus 1 in response to a user instruction, controls a driving state, and presents to a user a state of the UFB-containing liquid manufacturing apparatus 1. A CPU 301 has control over the host PC while using a RAM 302 as a work area in accordance with programs stored in a HDD 303. A display I/F 306 is an interface for displaying on a display (not shown) a state of the UFB-containing liquid manufacturing apparatus 1 and conditions for driving the UFB-containing liquid manufacturing apparatus 1. A keyboard mouse I/F 305 is an interface for receiving a user's command from a keyboard or mouse (not shown). A data transfer I/F (interface) 304 is an interface for transmitting and receiving information to and from the UFB-containing liquid manufacturing apparatus 1.

Meanwhile, in the UFB-containing liquid manufacturing apparatus 1, a CPU 311 has control over the apparatus while using a RAM 312 as a work area in accordance with programs stored in a ROM 313. A data transfer I/F (interface) 314 is an interface for transmitting and receiving information to and from the host PC 300. For a connection system between the data transfer I/F 304 on the host PC 300 side and the data transfer I/F 314 on the UFB-containing liquid manufacturing apparatus 1 side, a USB, IEEE1394, LAN, and the like can be used.

A data processing accelerator 316 performs predetermined data processing on data received from the host PC 300 and stored in the RAM 312 under instructions from the CPU 311 and generates ejection data so that the liquid ejecting unit 10 can perform ejection. The data processing accelerator 316 is configured by hardware and can perform high-speed data processing compared to the CPU 311. If the CPU 311 writes parameters required for data processing and data before processing on a predetermined address in the RAM 312, the data processing accelerator 316 is activated to perform the predetermined data processing. It should be noted that the data processing accelerator 316 is not an essential configuration in the present embodiment. The CPU 311 may act as the data processing accelerator 316 instead.

Under instructions from the CPU 311, an ejection controller 315 drives the liquid ejecting unit 10 to eject liquid in accordance with data generated by the data processing accelerator 316 and stored temporarily in the RAM 312. More specifically, once the CPU 311 writes control parameters and ejection data for controlling the liquid ejecting unit 10 on a predetermined address in the RAM 312, the ejection controller 315 is activated, and the liquid ejecting unit 10 is driven and controlled in accordance with the control parameters and ejection data.

Description will be given of operation of manufacturing a UFB-containing liquid by using the UFB-containing liquid manufacturing apparatus 1 of the present embodiment and testing results of a collected UFB-containing liquid. First, in the host PC 300, data for ejecting operation was generated, and the liquid ejecting unit 10 was caused to perform the ejecting operation. More specifically, the tank 20 containing pure water was installed on the liquid ejecting unit 10 and each of the entire 768 nozzles was driven at a driving frequency of 20 KHz. About 5 pl of droplets were ejected from each ejection opening 11 at a frequency of 20 KHz, and after two minutes, the collection container 30 was filled with the UFB-containing liquid. At this time, an ambient temperature was 25° C. and an ambient humidity was 60%.

After the collection container 30 was removed from the UFB-containing liquid manufacturing apparatus 1 and its cap (not shown) was closed to seal the container, the liquid in the collection container 30 was measured by SALD-7500 Fine Bubble Measurement System available from Shimadzu Corporation. It was confirmed that the liquid contained not less than 3.0 billion of ultrafine bubbles (UFBs) having a diameter of less than 1.0 μm per ml.

FIG. 6 is a graph showing a particle size frequency distribution of bubbles present in the liquid based on the measurement results of the measurement system. Bubbles having a diameter between 10 nm and 400 nm accounted for 99.8% of the total bubbles in different sizes present in the liquid.

Bubbles having a size greater than UFBs such as millibubbles and microbubbles rise with buoyancy and collapse when they communicate with atmosphere, and physical impact upon collapsing causes the UFBs to collapse as well. However, in the UFB-containing liquid manufactured according to the present embodiment, bubbles greater than the UFBs have been very few since the manufacture. For this reason, frequency of the physical impact itself is low, and the number of UFBs hardly changes even if the bubbles are left for a long period of time. To verify this, the present inventors stored the UFB-containing liquid, which was manufactured by the liquid ejecting unit 10 and collected and sealed in the glass collection container 30, for three months at a temperature of about 25° C., and the UFB-containing liquid was again measured by the measurement system. As a result, change was hardly seen as for the findings that a content concentration of UFBs was not less than 3.0 billion per ml and that the UFBs accounted for not less than 99.8% of the total bubbles, and the particle size frequency distribution shown in FIG. 6. In other words, according to the above-described present embodiment, it is possible to generate a stable UFB-containing liquid having a high purity in a short period of time with a small and simple configuration.

Next, by using the basic configuration of the UFB-containing liquid manufacturing apparatus 1 of the present embodiment, modifications to more efficiently collect a UFB-containing liquid will be described.

[Modification 1]

FIG. 7A and FIG. 7B are schematic diagrams showing a liquid ejecting unit 10 and a collection container 30 used in Modification 1. As shown in FIG. 7B, the liquid ejecting unit 10 of the present modification has seven ejection opening arrays 12, each having 768 ejection openings arranged thereon, in an X direction crossing an arrangement direction. Further, seven tanks 20 can be installed on the liquid ejecting unit 10 as shown in FIG. 7A, and liquids contained in their respective tanks 20 are individually supplied to their respective ejection opening arrays 12 and ejected from their respective ejection opening arrays 12. According to the present modification, it is possible to manufacture a UFB-containing liquid at a speed seven times as high as the above embodiment. Needless to say, the number of ejection opening arrays is not limited to seven. Any configuration of ejecting liquids contained in N tanks 20 individually from N ejection opening arrays 12 may be employed.

It should be noted that in the present modification, liquids contained in the plurality of tanks 20 may not be the same type. Different liquids supplied from their respective tanks 20 may be ejected from individual nozzle arrays 12 and mixed in the same collection container 30, so that a UFB-containing liquid having target properties is generated.

[Modification 2]

FIG. 8A to FIG. 8C are schematic diagrams showing a liquid ejecting unit 10 and a collection container 30 used in Modification 2. As shown in FIG. 8A, in the present modification, a cap 50 of a rubber member is brought into intimate contact with an ejection opening surface of the liquid ejecting unit 10, and droplets ejected from an ejection opening 11 are received in the cap 50. The received liquid is collected by the collection container 30 via a tube 51.

In this modification, the ejected droplets can be reliably led to the collection container 30 irrespective of a positional relation between the liquid ejecting unit 10 and the collection container 30. Accordingly, the position and shape of the collection container 30 can be flexibly designed. Furthermore, since droplets containing UFBs are contained in a sealed space cut off from the outside air immediately after being ejected from the liquid ejecting unit 10, it is possible to prevent droplets from evaporating and increase a collection efficiency of the UFB-containing liquid compared to the case of direct ejection toward the collection container 30.

In addition, in the aspect in which the liquid ejecting unit 10 as shown in FIG. 4A performs direct ejection toward the collection container 30, it is desirable that the collection port of the collection container 30 be wider than the ejection opening surface. In the present modification, it is possible to design a diameter of the collection port as small as an outer diameter of the tube 51. Accordingly, it is possible to prevent entry of foreign matter, such as dust, into the UFB-containing liquid.

FIG. 8B and FIG. 8C show examples in which a filter 52 is further placed for preventing entry of foreign matter, in comparison with the modification of FIG. 8A. FIG. 8B shows an example of providing the filter 52 upstream of the liquid ejecting unit 10, between the tank 20 and the liquid ejecting unit 10. In this configuration, in a case where liquid collected from the natural world such as groundwater and rainwater is contained in the tank 20, it is possible to prevent the foreign matter from entering the liquid ejecting unit 10. In a case where the foreign matter enters the liquid ejecting unit 10 which has a fine flow path configuration, clogging may occur in the flow path and an ejection state may be unstable. If the filter 52 is provided immediately upstream of the liquid ejecting unit 10 as in this modification, clogging in the flow path can be prevented, resulting in increase in a manufacturing efficiency of the UFB-containing liquid. It should be noted that the filter 52 in this case has preferably an average mesh size of 50 μm or less.

Meanwhile, FIG. 8C shows an example in which the filter 52 is placed inside the cap 50. As for a small foreign matter that will not affect ejecting operation of the liquid ejecting unit 10 but may have an adverse effect in actual use of a UFB-containing liquid after manufacture, the filter 52 can prevent the foreign matter from being contained in the collection container 30. It is desirable that the filter 52 in this case have a sufficiently small average mesh size, but an average mesh size is preferably 1.0 μm or greater so as not to block passage of the UFB itself. It should be noted that the filter 52 shown in FIG. 8B and the filter 52 shown in FIG. 8C may also be used in combination.

[Modification 3]

FIG. 9A and FIG. 9B are diagrams showing a modification in which a circulation system 60 for circulating liquid is provided, in addition to a liquid ejecting unit 10 and a collection container 30. The circulation system 60 of FIG. 9A is provided with a circulation path 63 that connects a cap 50 and a tank 20 not through the liquid ejecting unit 10. A path extending from the cap 50 branches into two: one connected to the collection container 30 and the other connected to the tank 20. The path connected to the collection container 30 is provided with a valve 62A and the path connected to the tank 20 is provided with a valve 62B. In the middle of the circulation path 63 that connects the cap 50 and the tank 20, a pump 61 for transferring liquid from the cap 50 to the tank 20 is provided.

In this configuration, if the liquid ejecting unit 10 is caused to perform ejecting operation with the valve 62A and the valve 62B closed, the liquid in the tank 20 is gradually consumed and the UFB-containing liquid is gradually accumulated in the cap 50. At a timing when the liquid is accumulated in the cap 50 to some extent, the ejecting operation is stopped, and when only the valve 62B is opened and the pump 61 is actuated, the liquid reserved in the cap 50 returns again to the tank 20. The above process is repeated N times, and then the valve 62A is opened with the valve 62B kept closed after $(N+1)^{th}$ ejecting operation is further performed, the liquid in the cap 50 is collected by the collection container 30 according to gravity. In this manner, repeating film boiling and ejecting operation multiple times on the same liquid allows the liquid to have a further increased concentration of UFB content.

The circulation system 60 of FIG. 9B has a first pump 61A and a second pump 61B in the middle of the circulation path 63 and further a second collection container 31 between these two pumps. The liquid reserved in the second collection container 31 by the first pump 61A returns to the tank 20 by actuation of the second pump 61B. In the case of the circulation system as shown in FIG. 9B, the UFB-containing liquid may be collected by both of the first collection container 30 and the second collection container 31.

[Modification 4]

FIG. 10A to FIG. 10D are diagrams showing a modification in which a function of formulating a UFB-containing liquid is provided. In a case where a concentration of UFB content of a manufactured UFB-containing liquid is higher than a target concentration, it is preferable to further apply a diluent to the UFB-containing liquid collected by a collection container 30 to formulate the UFB-containing liquid having a UFB concentration suitable for actual purposes. For such a case, FIG. 10A shows an aspect in which ejecting operation by a liquid ejecting unit 10 and application of a diluent by a diluting mechanism 70 are performed on the collection container 30 at the same time. Meanwhile, FIG. 10B shows an aspect in which the diluting mechanism 70 applies a diluent in another position of an apparatus 1 to the collection container 30 which reserves a predetermined amount of UFB-containing liquid through the ejecting operation by the liquid ejecting unit 10.

Furthermore, in the UFB-containing liquid, to formulate gas included in UFBs and liquid containing UFBs having target properties, it is also possible to apply a predetermined modifier to the liquid in a tank 20. FIG. 10C shows an example in which a liquid modifying mechanism 21 containing the modifier is attached to the tank 20. Meanwhile, FIG. 10D shows an example in which the liquid modifying mechanism 21 is placed at a location different from the tank 20, and the predetermined modifier is injected to the tank 20 via a tube or the like.

In need of including a desired gas in UFBs, a modifier may be the desired gas component. More specifically, examples of the modifier include: hydrogen, helium, oxygen, nitrogen, methane, fluorine, neon, carbon dioxide, ozone, argon, chlorine, ethane, propane, air, and gaseous mixtures thereof.

Furthermore, a modifier may be a microbubble-containing liquid including a desired gas component. Microbubbles are bubbles larger than ultrafine bubbles which are intended to be manufactured by the present invention. The microbubbles have a floating speed lower than that of millibubbls and stay in contact with liquid for a long period of time. Accordingly, if microbubbles containing a desired gas are included in liquid beforehand, the gas is encouraged to dissolve in the liquid, and as a result, UFBs containing a desired gas can be generated. More specifically, it is possible to use a microbubble-containing liquid including, for example, hydrogen, helium, oxygen, nitrogen, methane, fluorine, neon, carbon dioxide, ozone, argon, chlorine, ethane, propane, air, and gaseous mixtures thereof.

It should be noted that for the purpose of removing a specific gas component from the UFB-containing liquid after completion, a predetermined gas component or a microbubble-containing liquid including the predetermined gas component may be applied as a modifier. Needless to say, the configuration of applying a diluent as shown in FIG. 10A and FIG. 10B and the configuration of applying a modifying solution as shown in FIG. 10C and FIG. 10D may also be used in combination.

[Modification 5]

As for droplets ejected from a liquid ejecting unit 10 and a UFB-containing liquid after collected by a collection container 30, a certain level of evaporation cannot be avoided. However, the level of evaporation depends on a surrounding ambient temperature and humidity. Accordingly, in a UFB-containing liquid manufacturing apparatus 1, it is preferable that a temperature and a humidity in an environment in which the liquid ejecting unit 10 and the collection container 30 are placed be appropriately managed. More specifically, it is preferable to maintain a temperature of 70° C. or lower and a humidity of 50° C. or higher.

FIG. 11A shows an example in which a temperature humidity control mechanism 80 is provided inside an apparatus 1. Meanwhile, FIG. 11B shows an example in which the apparatus 1 is provided in an environment cell 81 which is equipped with the temperature humidity control mechanism 80. In either case, the liquid ejecting unit 10 and the collection container 30 that collects the liquid ejected from the liquid ejecting unit 10 are placed in an appropriate environment to prevent evaporation from the liquid being ejected from the liquid ejecting unit 10 and from the collection container 30, thereby increasing a collection efficiency of the UFB-containing liquid.

The first embodiment and its Modifications 1 to 5 have been described, but they may also be combined with each other. For instance, the configurations of Modifications 2 to 4 may also be added to a system having a plurality of tanks 20 and ejection opening arrays 12 as shown in Modification 1. Furthermore, the configurations having the cap 50 as shown in Modification 2 and Modification 3 and the configuration of controlling a temperature and humidity as shown in Modification 5 may be combined, so that a collection efficiency of a UFB-containing liquid is further increased.

Furthermore, as for the first embodiment and Modifications 1 to 3, an aspect of immersing an ejection opening surface of the liquid ejecting unit 10 in liquid may be employed. In the aspect of immersing the ejection opening surface in liquid, evaporation caused by dispersion of droplets can be reduced, and further a collection rate of a UFB-containing liquid can be increased. In this case, the liquid in which the ejection opening surface is immersed may be a UFB-containing liquid ejected from the liquid ejecting unit 10 or may be liquid prepared in advance in a collecting unit.

[Second Embodiment]

FIG. 12A and FIG. 12B are a top view and a side view, respectively, for explaining an internal configuration of a UFB-containing liquid manufacturing apparatus 1 used in a second embodiment. In the UFB-containing liquid manufacturing apparatus 1 of the present embodiment, a liquid ejecting unit 10 and tanks 20 are installed on a carriage 90 that reciprocates in a X direction, and the liquid ejecting unit 10 can perform ejecting operation in various positions in the X direction. The liquid ejecting unit 10 has four ejection opening arrays 12 arranged in the X direction, and each ejection opening array 12 supplies liquid from a corresponding one of four tanks 20 mounted on the carriage 90.

The carriage 90 is attached to a guide shaft 100 extending in the X direction and reciprocates in the X direction at a predetermined speed along the guide shaft 100 by a driving force of a carriage motor (not shown). While the carriage 90 moves in the X direction, the liquid ejecting unit 10 ejects liquid in a Z direction, whereby a UFB-containing liquid is gradually reserved in a collection container 30.

At a top end part in the X direction in an area where the carriage 90 is movable, a maintenance unit 110 for performing a maintenance process on the liquid ejecting unit 10 is provided. The maintenance unit 110 is provided with a cap 50, a pump 61, and a valve 62, and can perform a maintenance process on the liquid ejecting unit 10 in a state where the carriage 90 is located immediately above the maintenance unit 110. More specifically, a predetermined amount of liquid can be forcibly discharged from the liquid ejecting unit 10 by causing the cap 50 to abut on the ejection opening surface, opening the valve 62, and driving the pump 61.

In the liquid ejecting unit 10 after performing the ejecting operation to some extent, bubbles larger than UFBs may stagnate inside the liquid ejecting unit 10 and prevent ejection of a UFB-containing liquid. Further, if the temperature of the liquid ejecting unit 10 becomes too high through the ejecting operation, a UFB generation efficiency may decrease or the liquid ejecting unit 10 may not perform suitable ejecting operation. Even in such cases, if the maintenance unit 110 forcibly discharges liquid from the liquid ejecting unit 10, removes bubbles from head, and lowers the temperature of the liquid ejecting unit, the liquid ejecting unit 10 can recover to a normal driving state.

At this time, the liquid forcibly discharged from the liquid ejecting unit 10 by the maintenance unit 110 also includes some UFBs that are not discharged through ejecting operation. Accordingly, a collection container 32 may be newly prepared to contain liquid collected through maintenance operation and the liquid may be used as a UFB-containing liquid. In the two collection containers 30 and 32, an absorber may be placed for retaining liquid in one or two of the collection containers 30 and 32, and the liquids collected by the two collection containers may be led to the same absorber.

It should be noted that although FIG. 12A and FIG. 12B show a box-type collection container 30 extending in the X direction, the collection container 30 of the present embodiment is not limited to this.

FIG. 13A and FIG. 13B are diagrams showing another embodiment of the collection container 30. FIG. 13A shows an aspect in which four collection containers 30 as shown in the first embodiment are arranged in the X direction. In this case, different types of UFB-containing liquids can be manufactured at the same time if different types of liquids are contained in four tanks 20, four ejection opening arrays 12 are caused to perform ejection in different positions in the X direction, and the collection containers 30 are arranged in the respective ejection positions.

Further, FIG. 13B shows an aspect in which a tray 33 extending in the X direction is provided, and on the tray 33, a plurality of collection containers 30 like the one used in the first embodiment are arranged in the X direction. In a configuration in which the liquid ejecting unit 10 performs ejecting operation while moving as in the present embodiment, ejected droplets tend to float in the X direction, and a collection rate by the collection container 30 decreases. However, in the configuration as shown in FIG. 13B, also the droplets that are not contained in the collection container 30 can be collected by the tray 33, and a collection efficiency can be increased.

FIG. 14 is a block diagram for explaining a control configuration of the UFB-containing liquid manufacturing apparatus 1 of the present embodiment. A difference from the one explained with reference to FIG. 5 in the first embodiment is that the UFB-containing liquid manufacturing apparatus 1 is provided with a carriage controller 317 and a maintenance controller 318. The carriage controller 317 drives a carriage motor (not shown) under instructions from a CPU 311 to control movement of the carriage 90 in the X direction. That is, the CPU 311 causes the liquid ejecting unit 10 to eject droplets at a predetermined frequency by the ejection controller 315 while causing the carriage 90 to move at a predetermined speed by the carriage controller 317.

The maintenance controller 318 drives the cap 50, the valve 62, and a motor 61 in the case where the carriage 90 is in a position of the maintenance unit 110 to perform a maintenance process on the liquid ejecting unit 10.

It should be noted that a moving speed of the carriage 90, an ejection pattern of the liquid ejecting unit, a frequency of maintenance process by the maintenance unit 110, a suction amount of liquid, and the like are controlled by a host PC 300 sending commands to the UFB-containing liquid manufacturing apparatus 1. Such control may also be made by instructions through a keyboard mouse I/F 304 by a user while checking a state of the UFB-containing liquid manufacturing apparatus 1 via a display on the host PC 300.

FIG. 15A and FIG. 15B are diagrams for explaining experiments performed by the present inventors using the UFB-containing liquid manufacturing apparatus 1 of the present embodiment, to test a relation between a distance between the ejection opening surface of the liquid ejecting unit 10 and the collection port of the collection container 30 and a collection amount of a UFB-containing liquid. In the present test experiment, only one of four ejection opening arrays 12 was caused to perform ejecting operation, and pure water was contained in the corresponding tank 20. Then, five collection containers 30 having the same diameter and different heights were arranged as shown in FIG. 15A and the ejection opening arrays 12 were caused to perform the same number of times of ejecting operation in each position of the collection container 30.

Each collection container 30 was made from glass, and the collection port had a diameter of 2 cm. Furthermore, a distance (A-C) between a height A of the ejection opening surface and a height C of the bottom of the collection container was 60 mm for all of the collection containers. Distances (A-B) between the height A of the ejection opening surface and a height B of the collection port were 1 mm, 5 mm, 10 mm, 30 mm, and 50 mm for the collection containers 30 from the left side.

Based on the above, the liquid ejecting unit 10 was driven so as to eject 5 pl of droplets from each ejection opening at a frequency of 20 KHz, and the carriage 90 was reciprocated so that the same ejecting operation was performed in all positions of the collection containers 30. Such ejecting operation was performed for several hours while occasionally transferring the UFB-containing liquid to a different container so that the UFB-containing liquid did not overflow the collection container 30, and then the volumes of the UFB-containing liquid respectively collected by five collection containers 30 were measured.

FIG. 15B is a table showing results of the above measurement. According to the figure, it can be found that as the distance (A-B) between the ejection opening surface and the collection port decreases, a volume of a collective liquid increases. This is because as a distance of movement of the ejected droplet across a space before reaching the collection port decreases, a possibility of floating or evaporation to an area other than the collection container is assumed to decrease.

Meanwhile, the UFB-containing liquid collected individually by the collection containers 30 was measured by SALD-7500 Fine Bubble Measurement System available from Shimadzu Corporation. It was confirmed that all of the collection containers 30 had the same concentration of UFB content. That is, in view of a collection efficiency of the UFB-containing liquid, it is preferable that the collection container 30 be located such that the collection port is as close as possible to the ejection opening surface.

FIG. 16A and FIG. 16B are diagrams showing experiments performed by the present inventors to test a relation between a distance between the ejection opening surface and the bottom of the collection container and a collection amount of a UFB-containing liquid by using the UFB-containing liquid manufacturing apparatus 1 of the present embodiment. Also in the present test experiment, like FIG. 15A and FIG. 15B, only one of four ejection opening arrays 12 was caused to perform ejecting operation, and pure water was contained in the corresponding tank 20. Then, five collection containers 30 having the same diameter and different heights were arranged as shown in FIG. 15B, and the ejection opening arrays 12 were caused to perform the same number of times of ejecting operation in respective positions of the collection containers 30.

Each collection container 30 was made from glass, and the collection port had a diameter of 2 cm. Furthermore, a distance (A-B) between the height A of the ejection opening surface and the height B of the collection port was 5 mm for all of the collection containers. Distances (A-C) between the height A of the ejection opening surface and the height C of the bottom of the collection container were 30 mm, 60 mm, 70 mm, 80 mm, and 100 mm for the collection containers 30 from the left side. To align the top of the collection ports for the plurality of collection containers 30 having different heights, the present test experiment used a height adjusting tool 41.

Based on the above, the liquid ejecting unit 10 was driven so as to eject 5 pl of droplets from each ejection opening at a frequency of 20 KHz, and the carriage 90 was reciprocated so that the same ejecting operation was performed in all positions of the collection containers 30. Such ejecting operation was performed for several hours while occasionally transferring a UFB-containing liquid to a different container so that the UFB-containing liquid did not overflow the collection container 30, and then the volumes of the UFB-containing liquid respectively collected by five collection containers 30 were measured.

FIG. 16B is a table showing results of the above measurement. According to the figure, it can be found that as the distance (A-C) between the ejection opening surface and the bottom of the collection container decreases, a volume of a collective liquid increases. This is because as a distance of movement of the ejected droplet across a space before reaching the bottom of the collection container 30 or the liquid already reserved in the collection container decreases, a possibility of evaporation is assumed to decrease.

Meanwhile, the UFB-containing liquid collected individually by the collection containers 30 was measured by SALD-7500 Fine Bubble Measurement System available from Shimadzu Corporation. It was confirmed that all of the collection containers 30 had the same concentration of UFB content. That is, in view of a collection efficiency of the UFB-containing liquid, it is preferable that the collection container 30 be located such that its bottom is as close as possible to the ejection opening surface. Furthermore, in consideration of the test experiment shown in FIG. 15A and FIG. 15B as well, it can be said that the collection container 30 is preferably located such that its collection port and bottom are as close as possible to the ejection opening surface.

FIG. 17A and FIG. 17B are diagrams showing examples of a collection method based on the above results of the test experiments. FIG. 19A shows an aspect of using the tray 33 extending in the X direction. Supports 33*b* that are relatively elongated hold a receiving surface 33*a* in opposite positions near the ejection opening surface. In the case of such a configuration, after performing some ejecting operation by the liquid ejecting unit 10 with respect to the receiving surface 33*a*, the tray 33 may be removed from the apparatus 1 and a reserved UFB-containing liquid may be collected by another collection container. Furthermore, an inclination may be provided on the receiving surface 33*a* so as to collect a UFB-containing liquid flowing along the inclination by a collection container.

In the present embodiment, the tray 33 having a depth of about 5 mm was used and a distance between the ejection opening surface and the bottom surface of the tray was about 10 mm. By using the tray 33 as a collecting unit in this manner, the distance between the ejection opening surface and the collection port or bottom surface of the collecting unit can be reduced as compared to the case of using the collection container 30, and a collection efficiency of a UFB-containing liquid can be increased. It should be noted that as a material of the tray 33, it is preferable to use an acrylic resin and the like and to subject the receiving surface 33*a* to water repellent coating treatment with a fluorocarbon resin. By subjecting the receiving surface 33*a* to water repellent treatment, the UFB-containing liquid adhering to the receiving surface 33 becomes spherical and the UFB-containing liquid can be prevented from evaporating, thereby increasing a collection rate of the UFB-containing liquid.

FIG. 17B shows an aspect of using a sheet 34 as a collecting unit of a UFB-containing liquid. By using the sheet 34 as a collecting unit, the distance between the ejection opening surface and the collection port or bottom surface of the collecting unit can further be reduced, and a collection efficiency of a UFB-containing liquid can further be increased.

It should be noted that also in the case of using the sheet 34 as a collecting unit, like the case of using a tray, it is preferable to subject its surface to water repellent treatment. However, in a case where droplets may spill over a peripheral end of a flat sheet to the inside of the apparatus, it is efficient to give absorbency only to the peripheral of the sheet.

Furthermore, in the case of using the sheet 34 as a collecting unit, it is preferable that an area to which droplets are applied should not deviate on the sheet as much as possible. This is because if the ejecting operation is repeatedly performed in the same location of the water repellent sheet 34, a collection rate of a UFB-containing liquid may decrease due to splashing of droplets, and the inside of the apparatus may be contaminated. Therefore, in the present embodiment, the sheet 34 is conveyed in the Y direction every time the liquid ejecting unit 10 performs scanning in the X direction.

FIG. 18A and FIG. 18B are diagrams showing an internal configuration of the UFB-containing liquid manufacturing apparatus 1 provided with a sheet conveying mechanism. FIG. 18A is a top view and FIG. 18B is a cross-sectional view. The water repellent sheet 34 placed on a sheet guide 120 is conveyed in the Y direction to a position where droplets can be applied by the liquid ejecting unit 10 with rotation of a conveying roller 130. In the position where droplets can be applied by the liquid ejecting unit 10, a platen 140 for supporting the sheet 34 from the back side and maintaining flatness of the sheet surface is provided.

In this configuration, main scanning in which the liquid ejecting unit 10 ejects droplets at a predetermined frequency while moving in the X direction and conveying operation in which the conveying roller 130 conveys the sheet 34 in the Y direction by a distance corresponding to a width in which droplets are applied by the main scanning are alternately repeated. If droplet application scanning is completed with respect to substantially the entire area of the sheet 34, the conveying roller 130 discharges the sheet 34 outside the apparatus.

Bending or inclining the water repellent sheet 34 allows freely collecting an applied UFB-containing liquid. For instance, a user may take out the discharged sheet manually to collect a UFB-containing liquid in a collection container that is separately prepared, or a sheet discharging unit of the apparatus may be provided with a mechanism for bending the sheet and collecting a UFB-containing liquid in a desired position. Furthermore, as shown in FIG. 18C, the apparatus 1 may be placed on a inclined mount so that liquid applied to the sheet 34 flows into the collection container 30 according to gravity. Furthermore, by using air blowing or the like, a UFB-containing liquid may be led to the collection container 30 placed in a predetermined position.

In either case, in the case where the water repellent sheet 34 is used as a collecting unit, a distance between the ejection opening surface of the liquid ejecting unit 10 and the flat sheet 34 can particularly be reduced, and it is thus possible to decrease a distance of movement of droplets across a space and to increase a UFB collection efficiency. In this embodiment, by using a PET film having a thickness of 0.5 mm, a distance between the ejection opening surface and the sheet surface could be set at about 1 mm.

Next, by using the UFB-containing liquid manufacturing apparatus 1 as shown in FIG. 12A, FIG. 12B, FIG. 18A, FIG. 18B, and FIG. 14, control methods for more efficiently manufacturing and collecting a UFB-containing liquid will be described.

FIG. 19A is a graph showing a relation between a temperature of liquid in the liquid ejecting unit 10 and a volume of gas remaining in the liquid after collected as a UFB-containing liquid. It can be found that as a temperature of the liquid increases (T1<T2<T3), the number of UFBs included in the UFB-containing liquid decreases (D1>D2>D3). It is therefore preferable that the temperature of the liquid ejecting unit 10 being driven be appropriately adjusted.

Meanwhile, in the liquid ejecting unit 10, as a driving frequency of the plurality of heaters 208 increases and the number of times of driving increases, the temperatures of the heater 208 and the liquid around the heater 208 increase. Therefore, in the UFB-containing liquid manufacturing apparatus 1, it is preferable to generate ejection data for driving the liquid ejecting unit 10 so as to maintain the temperature of the liquid ejecting unit 10 within a preferable range.

FIG. 19B is a graph showing examples of control methods for maintaining the temperature of the liquid ejecting unit 10 within a predetermined range while causing the liquid ejecting unit 10 to perform ejecting operation. In the figure, a horizontal axis indicates a time and a vertical axis indicates a temperature of the liquid ejecting unit 10.

In a control method 1, a period in which ejecting operation is performed at a maximum driving frequency and a period in which ejecting operation is not performed are alternately repeated. As used herein, the term "maximum driving frequency" means a maximum frequency capable of driving the heater 208 under a condition that the liquid ejecting unit 10 can perform normal ejecting operation. In the figure, periods P1, P3, P5 indicate periods in which ejecting operation is performed at a maximum driving frequency, whereas periods P2, P4, P6 indicate periods in which driving is suspended.

In the periods P1, P3, P5, since a voltage is repeatedly applied to the plurality of heaters 208, the temperature of the liquid ejecting unit 10 increases from T1 to T3. In the periods P2, P4, P6, since application of a voltage to the heaters is suspended, the temperature of the liquid ejecting unit 10 decreases from T3 to T 1. In this manner, in the control method 1, the period in which the liquid ejecting unit 10 is driven and the period in which the driving is suspended are repeated at predetermined intervals, whereby the temperature of the liquid ejecting unit 10 is maintained in a desired range (T1 to T3) and liquid with a greater UFB content can be efficiently manufactured.

FIG. 20A to FIG. 20C are diagrams showing a method for collecting a UFB-containing liquid for the UFB-containing liquid manufacturing apparatus 1 in the case of employing the control method 1 and ejection data. In FIG. 20A, a collection area L1 indicates an area that can face all of the nozzle arrays 12 in a scanning area L0 of the carriage 90. The collection area L1 includes a collection area L2 where the collection container 30 is placed and liquid is actually collected and a non-collection area L3 other than the collection area L2.

In the case of employing the control method 1, the CPU 311 reciprocates the carriage 90 in the X direction in the entire area of the scanning area L0 while causing the liquid ejecting unit to perform ejecting operation only in the collection area L2 where the collection container 30 is placed. Accordingly, a period in which the carriage 90 moves in the collection area L2 corresponds to the periods P1, P3, P5 shown in FIG. 19B and the period in which the carriage 90 moves in the non-collection area L3 corresponds to the periods P2, P4, P6 shown in FIG. 19B.

FIG. 20B and FIG. 20C show ejection data used in the control method 1. In the figures, the X direction corresponds to a moving direction of the carriage 90 and the Y direction corresponds to the number of times of main scanning. In a case where the water repellent sheet 34 is used as a collecting unit as shown in FIG. 18A and FIG. 18B, the direction in which the sheet 34 is conveyed corresponds to the Y direction. In FIG. 20B and FIG. 20C, a black area indicates an area where data represents ejection (1) and a white area indicates an area where data represents non-ejection (0).

Now, FIG. 20B shows a case where the collection area L2 is half the collection area L1 and FIG. 20C shows a case where the collection area L2 is a quarter of the collection area L1. As the L2 becomes smaller compared to the L1, the periods P1, P3, P5 decrease, thereby suppressing rise in temperature of the liquid ejecting unit 10. In a case where ejecting operation is performed based on binary ejection data as shown in FIG. 20B and FIG. 20C, the temperature of the liquid ejecting unit 10 varies as shown by the control method 1 of FIG. 19B, and it is possible to collect a UFB-containing liquid with a high purity by the collection container 30.

Referring back to FIG. 19B, a control method 2 shows change in temperature in a case where the liquid ejecting unit 10 is continuously driven at a frequency lower than the maximum driving frequency. Driving the liquid ejecting unit 10 at a relatively low frequency allows maintaining a constant temperature of the liquid ejecting unit 10 and continuously manufacturing liquid with a greater UFB content even if a driving period and a non-driving period are not provided like in the control method 1. In the case of employing the control method 2, the CPU 311 causes the liquid ejecting unit 10 to perform ejecting operation at a frequency lower than that in the control method 1 in the entire area of the scanning area L0 of the carriage 90.

FIG. 21A and FIG. 21B show examples of ejection data used in the control method 2 like in FIG. 20B and FIG. 20C. The entire data area includes data representing ejection (1), but an arrangement density (ejection duty) of the data representing ejection (1) is low as compared to the data shown in FIG. 20A and FIG. 20B. Given that a maximum ejection duty that can be achieved by the UFB-containing liquid manufacturing apparatus 1 is 100%, FIG. 21A shows an ejection duty of 50% and FIG. 21B shows an ejection duty of 25%.

FIG. 22A to FIG. 22C show examples (enlarged views) of ejection data arrangement to give an ejection duty of 50%. FIG. 22D to FIG. 22F show examples (enlarged views) of ejection data arrangement to give an ejection duty of 25%. FIG. 22A and FIG. 22D show ejection data in which all of the ejection openings included in the ejection opening array 12 repeat ejection and non-ejection at the same timing. FIG. 22B and FIG. 22E show ejection data in which ejection openings having an ejection duty of 100% and ejection openings having an ejection duty of 0% (not performing ejecting operation) are arranged at a constant period in the ejection opening array 12 arranged in the Y direction. FIG. 22C and FIG. 22F show ejection data in which adjacent ejection openings do not simultaneously perform ejection while keeping a uniform ejection duty (50% or 25%) for all of the ejection openings. In any ejection data, it is possible to set an ejection duty of the liquid ejecting unit 10 as a whole at an ejection duty lower than 100% and maintain the temperature of the liquid ejecting unit 10 within a preferable range.

That is, by performing ejecting operation based on binary ejection data as shown in FIG. 22A to FIG. 22C, a UFB-containing liquid with a high purity can be collected while changing the temperature of the liquid ejecting unit 10 as shown by the control method 2 of FIG. 19B.

It should be noted that the temperature of the liquid ejecting unit 10 is affected by a temperature in an environment where the apparatus 1 is installed and the like as well as a driving frequency of the liquid ejecting unit 10. For this reason, there may be a case where temperature variations as shown in FIG. 19B cannot be obtained even if the control method 1 and the control method 2 are employed in the same way. In such a case, it is preferable to provide a temperature detecting unit for detecting a temperature of the liquid ejecting unit 10 and change a driving period or driving frequency of the heater 208 based on the detection result. For example, in the case of employing the control method 1, by adjusting the periods P1, P3, P5 in which the heater 208 is driven and the periods P2, P4, P6 in which the heater 208 is not driven, it is possible to maintain the temperature of the liquid ejecting unit 10 within a preferable range. Meanwhile, in the case of employing the control method 2, arrangement of ejection data shown in FIG. 22A to FIG. 22F may be adjusted so as to maintain a frequency of the liquid ejecting unit at an appropriate value.

[Third Embodiment]

FIG. 23A and FIG. 23B are diagrams showing an internal configuration of a UFB-containing liquid manufacturing apparatus 1 provided with a liquid ejecting unit 10 used in a third embodiment. As shown in FIG. 23A, the liquid ejecting unit 10 of the present embodiment is configured by arranging further in the X direction a plurality of nozzle arrays 12, which are described in the first embodiment, and the length of the X direction corresponds to the width of a sheet 34 conveyed in the Y direction. Then, four liquid ejecting units 10 are further prepared and arranged in the Y direction in a state shown in FIG. 23B. At this time, liquid supplied to the liquid ejecting units 10 may be mounted in each of the liquid ejecting units 10 as in the above embodiments, but may be supplied to each of the liquid ejecting units 10 via a tube (not shown).

The water repellent sheet 34 is continuously conveyed in the Y direction at a predetermined speed by a conveying roller 130, and the four liquid ejecting units 10 eject droplets to the sheet 34 at a constant frequency. At this time, ejection data for each liquid ejecting unit 10 is preferably the one shown in FIG. 22C or FIG. 22F where dispersion is high.

According to the present embodiment, it is possible to manufacture a large quantity of UFB-containing liquid with a high purity in a shorter period of time compared to the second embodiment.

It should be noted that the sheet 34 according to the present embodiment may be a cut sheet or a continuous sheet as long as a UFB-containing liquid applied thereto can be reliably collected. Further, although FIG. 23A and FIG. 23B show the aspect of using the sheet 34 as a collecting unit, also in the present embodiment, various modifications can be used as in the first and second embodiments such as providing a collection container 30 below the liquid ejecting unit 10.

[Other Embodiments]

The UFB-containing liquid manufacturing apparatus 1 may be provided with a UFB measurement unit capable of measuring an amount of liquid reserved in a collection container 30 and a content of UFBs in the liquid. A method for measuring a content of UFBs is not particularly limited. For example, it is possible to irradiate the inside of a collection container with a semiconductor laser and make measurement based on a state of scattered light or use a particle tracking analysis method.

FIG. 24 is a block diagram for explaining a control configuration of the UFB-containing liquid manufacturing apparatus 1 provided with the UFB measurement unit. A difference from the above embodiments is that the UFB-containing liquid manufacturing apparatus 1 is provided with a UFB measurement controller 319 for controlling the UFB measurement unit. The UFB measurement controller 319 controls the UFB measurement unit (not shown) under instructions from a CPU 311, detects an amount of liquid reserved in a collection container 30, a concentration of UFB content, particle size distribution, and the like, and provides the obtained information to the CPU 311.

For example, in a case where a predetermined amount of UFB-containing liquid is confirmed, the CPU 311 may complete ejecting operation of a liquid ejecting unit 10. Furthermore, in a case where a detected content of UFBs is less than a predetermined value, the circulation system 60 as shown in FIG. 9A and FIG. 9B may be used to return a collected UFB-containing liquid back to a tank 20 or a user may be prompted to replace the tank 20. On the other hand, in a case where a detected content of UFBs is greater than the predetermined value, a diluent may be added to the collection container 30 as shown in FIG. 10A and FIG. 10B described in Modification 4. Furthermore, without special treatment, the CPU 311 may transmit the information obtained from the UFB measurement unit directly to a host PC 300, and a CPU 301 of the host PC 300 may present the obtained information to a user via a display OF 306. In addition, the CPU 301 of the host PC 300 may newly generate ejection data to be transmitted to the liquid ejecting unit 10 based on the obtained information, i.e., a state of UFB content in liquid contained in the collection container 30. In this manner, with the UFB measurement unit, it is possible to adjust the UFB-containing liquid to a desired condition at the stage of manufacture.

In the above description, the aspect of controlling the UFB-containing liquid manufacturing apparatus 1 by the host PC 300 has been described. More specifically, the host PC 300 confirms the condition of the UFB-containing liquid manufacturing apparatus 1, generates data for driving the liquid ejecting unit 10, and performs a maintenance process. However, the present invention is not limited to such an aspect. The UFB-containing liquid manufacturing apparatus 1 itself may have the above-described function of the host PC 300 and a user may operate that UFB-containing liquid manufacturing apparatus 1 via a user interface provided on the UFB-containing liquid manufacturing apparatus 1. Furthermore, the CPU 311 of the UFB-containing liquid manufacturing apparatus 1 may make various controls as described in the above embodiments in accordance with programs stored in a ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-167598 filed Aug. 31, 2017, which is hereby incorporated by reference wherein in its entirety.

REFERENCE SIGNS LIST

1 ultrafine bubble-containing liquid manufacturing apparatus
10 liquid ejecting unit
11 ejection opening
14 flow path
30 collection container
208 energy generating element
315 ejection controller
311 CPU

The invention claimed is:

1. An ultrafine bubble-containing liquid manufacturing apparatus comprising:
- an ultrafine bubble generating unit configured to generate ultrafine bubbles with a diameter of less than 1.0 μm by bringing a liquid into film boiling, including:
  - a heater;
  - a flow path for leading the liquid to the heater;
  - a controller configured to drive the heater and cause film boiling in the liquid led to the heater; and
  - an ejection opening for ejecting liquid containing ultrafine bubbles generated by the film boiling; and
- a container configured to collect the liquid in a sealed space cut off from outside air immediately after being ejected from the ejection opening,
- wherein the apparatus is configured such at least 99.8% of bubbles in the liquid collected in the container are the ultrafine bubbles.

2. The ultrafine bubble-containing liquid manufacturing apparatus according to claim 1, wherein the ultrafine bubble generating unit comprises a plurality of ejection opening arrays,
- wherein each of the plurality of ejection opening arrays has ejection
- wherein the ejection openings are arranged in a predetermined direction,
- wherein the plurality of ejection opening arrays are arranged in a direction crossing the predetermined direction, and
- wherein a tank for supplying liquid individually to each of the plurality of ejection opening arrays is provided.

3. The ultrafine bubble-containing liquid manufacturing apparatus according to claim 1, wherein the controller drives the heater in a position where the ultrafine bubble generating unit faces the container.

4. The ultrafine bubble-containing liquid manufacturing apparatus according to claim 1, further comprising a suction unit configured to forcibly suck liquid contained in the ultrafine bubble generating unit from the ejection opening,
- wherein the container and the suction unit are placed in different positions in an area where the ultrafine bubble generating unit can move.

5. The ultrafine bubble-containing liquid manufacturing apparatus according to claim 4, further comprising a second container configured to collect liquid sucked by the suction unit.

6. The ultrafine bubble-containing liquid manufacturing apparatus according to claim 4, wherein the container collects liquid ejected from the ejection opening and liquid sucked by the suction unit.

7. The ultrafine bubble-containing liquid manufacturing apparatus according to claim 1, wherein to maintain a temperature of the ultrafine bubble generating unit within a predetermined range, the controller alternately repeats a period in which the heater is driven at a predetermined frequency and a period in which the heater is not driven.

8. The ultrafine bubble-containing liquid manufacturing apparatus according to claim 1, wherein to maintain a temperature of the ultrafine bubble generating unit within a predetermined range, the controller continuously drives the heater at a frequency lower than a maximum frequency at which the ultrafine bubble generating unit can perform a normal ejecting operation.

9. The ultrafine bubble-containing liquid manufacturing apparatus according to claim 1, wherein ejection of the liquid from the ejection opening results from splitting of the liquid from the liquid moved to the ejection opening along with growth of bubbles generated by the film boiling.

10. The ultrafine bubble-containing liquid manufacturing apparatus according to claim 1, wherein ejection of the liquid from the ejection opening results from movement of the liquid to the ejection opening along with growth of bubbles generated by the film boiling, on condition that the bubbles come into communication with atmosphere.

11. The ultrafine bubble-containing liquid manufacturing apparatus according to claim 1, wherein the container is a collection container having an opening facing the ejection opening.

12. The ultrafine bubble-containing liquid manufacturing apparatus according to claim 11, wherein the controller drives the heater in a state where the ejection opening of the ultrafine bubble generating unit is immersed in liquid.

13. The ultrafine bubble-containing liquid manufacturing apparatus according to claim 1, wherein the container includes:

a cap that comes into contact with an ejection opening surface of the ultrafine bubble generating unit;

a collection container for collecting liquid including the ultrafine bubbles; and a member for leading liquid from the cap to the collection container.

14. The ultrafine bubble-containing liquid manufacturing apparatus according to claim 1, which is configured to apply, to liquid that has not yet been supplied to the ultrafine bubble generating unit, a modifier for modifying the liquid that has not yet been supplied to the ultrafine bubble generating unit.

15. The ultrafine bubble-containing liquid manufacturing apparatus according to claim 14, wherein the modifier is a predetermined gas component for being included in the ultrafine bubbles generated by the film boiling along with driving of the heater, or a liquid containing microbubbles containing the predetermined gas component.

16. The ultrafine bubble-containing liquid manufacturing apparatus according to claim 14, wherein the modifier contains a component for exhausting a predetermined gas component from the liquid collected by the container.

17. The ultrafine bubble-containing liquid manufacturing apparatus according to claim 1, further comprising a filter in at least one of a position upstream of the ultrafine bubble generating unit and a position between the ultrafine bubble generating unit and the container.

18. An ultrafine bubble-containing liquid manufacturing apparatus comprising:

an ultrafine bubble generating unit configured to generate ultrafine bubbles with a diameter of less than 1.0 μm, including:

a heater;

a flow path for leading the liquid to the heater;

a controller configured to drive the heater to heat a surface of the heater to a temperature of 300° C. or higher and produce bubbles on the surface of the heater; and an ejection opening for ejecting liquid containing the ultrafine bubbles generated by production of the bubbles by heating the heater; and a container configured to collect the liquid in a sealed space cut off from outside air immediately after being ejected from the ejection opening, wherein the apparatus is configured such at least 99.8% of the bubbles in the liquid collected in the container are the ultrafine bubbles.

19. The ultrafine bubble-containing liquid manufacturing apparatus according to claim 1, wherein the container is configured to collect the liquid ejected from the ejection opening in a liquid state and is configured to be sealed with the liquid collected therein.

20. The ultrafine bubble-containing liquid manufacturing apparatus according to claim 18, wherein the container is configured to collect the liquid ejected from the ejection opening in a liquid state and is configured to be sealed with the liquid collected therein.

21. An ultrafine bubble-containing liquid manufacturing apparatus comprising:

an ultrafine bubble generating unit configured to generate ultrafine bubbles with a diameter of less than 1.0 μm by bringing a liquid into film boiling, including:

a heater;

a flow path for leading the liquid to the heater;

a controller configured to drive the heater and cause film boiling in the liquid led to the heater; and an ejection opening for ejecting liquid containing ultrafine bubbles generated by the film boiling; and a container configured to collect the liquid ejected from the ejection opening, wherein the apparatus is configured such that the liquid collected in the container contains at least 3.0 billion of the ultrafine bubbles per milliliter, both at a time of manufacture and after being stored in the container for three months from the time of manufacture at a temperature of 25° C. and wherein the apparatus is configured such at least 99.8% of bubbles in the liquid collected in the container are the ultrafine bubbles.

22. An ultrafine bubble-containing liquid manufacturing apparatus comprising:

an ultrafine bubble generating unit configured to generate ultrafine bubbles with a diameter of less than 1.0 μm by bringing a liquid into film boiling, including:

a heater;

a flow path for leading the liquid to the heater;

a controller configured to drive the heater and cause film boiling in the liquid led to the heater; and an ejection opening for ejecting liquid containing ultrafine bubbles generated by the film boiling; and a container configured to collect the liquid ejected from the ejection opening, wherein the apparatus is configured such that at least 99.8% of bubbles in the liquid collected in the container are the ultrafine bubbles, both at a time of manufacture and after being stored in the container for three months from the time of manufacture at a temperature of 25° C.

* * * * *